United States Patent
Först et al.

(10) Patent No.: US 12,009,764 B2
(45) Date of Patent: Jun. 11, 2024

(54) MOTOR CONTROL APPARATUS FOR CONTROLLING A POWER SUPPLY TO AN ELECTRICAL MOTOR

(71) Applicant: Future Systems Besitz GmbH, Rödental (DE)

(72) Inventors: Bernhard Först, Kronach (DE); Christian Zimmermann, Erlangen (DE)

(73) Assignee: Future Systems Besitz GmbH, Roedental (DE)

( * ) Notice: Subject to any disclaimer, the term of this patent is extended or adjusted under 35 U.S.C. 154(b) by 351 days.

(21) Appl. No.: 17/431,628

(22) PCT Filed: Feb. 20, 2020

(86) PCT No.: PCT/EP2020/054538
§ 371 (c)(1),
(2) Date: Aug. 17, 2021

(87) PCT Pub. No.: WO2020/169765
PCT Pub. Date: Aug. 27, 2020

(65) Prior Publication Data
US 2022/0140769 A1     May 5, 2022

(30) Foreign Application Priority Data
Feb. 22, 2019   (EP) .................................... 19158869

(51) Int. Cl.
*H02P 29/024*     (2016.01)
*H02H 1/00*       (2006.01)
(Continued)

(52) U.S. Cl.
CPC ......... *H02P 29/027* (2013.01); *H02H 1/0007* (2013.01); *H02H 3/05* (2013.01);
(Continued)

(58) Field of Classification Search
CPC ............................... H02P 29/027; H02P 23/14
(Continued)

(56) References Cited

U.S. PATENT DOCUMENTS 4,345,292 A     8/1982   Jaeschke et al.
8,310,196 B2 *  11/2012  Ams ................... H02H 7/0844
                                                   701/84

(Continued)

FOREIGN PATENT DOCUMENTS

DE     42 42 560 A1    7/1993
DE    197 29 599 C1    2/1999
(Continued)

OTHER PUBLICATIONS

Lim, S., "Small DFN Electronic Circuit Breaker Eliminates Sense Resistor," Linear Technology Magazine, May 2005, p. 25 (2 pages).
(Continued)

*Primary Examiner* — Kawing Chan
(74) *Attorney, Agent, or Firm* — Maginot, Moore & Beck

(57) ABSTRACT

A motor control apparatus for controlling a power supply to an electrical motor (M) connected to an output terminal (3) of the motor control apparatus (1) comprising:
an overcurrent protection circuit (1A) having a power switch (5) through which the electrical motor (M) receives an electrical load current ($I_L$) and having a sensor component (4) connected in series with the power switch (5) and adapted to generate directly a voltage drop ($\Delta U_4$) corresponding to the current rise speed of the electrical load current ($I_L$) flowing from an input terminal (2) of the motor control apparatus (1) via the sensor component (4) and the power switch (5) to the output terminal (3) and having a driver circuit (6) adapted to detect an occurring overcurrent depending on the voltage drop ($\Delta U_4$) generated by the sensor component (4) and/or depending on a (Continued)

voltage drop ($\Delta U_5$) along the power switch (5) and adapted to switch off said power switch (5) upon detection of an overcurrent within a switch-off period of less than one millisecond; and/or comprising a power supply control circuit (10) having a sensor component (9) adapted to measure at the input terminal (2) a supply voltage notified to a control unit (8) of the motor control apparatus (1) adapted to control an electrical power supplied to the electrical motor (M) depending on an operation mode of the electrical motor (M).

29 Claims, 10 Drawing Sheets

(51) Int. Cl.
| | |
|---|---|
| *H02H 3/05* | (2006.01) |
| *H02H 3/08* | (2006.01) |
| *H02H 3/093* | (2006.01) |
| *H02H 7/08* | (2006.01) |
| *H02H 7/12* | (2006.01) |
| *H02H 7/122* | (2006.01) |
| *H02H 7/22* | (2006.01) |
| *H02P 23/14* | (2006.01) |

(52) U.S. Cl.
CPC .............. *H02H 3/08* (2013.01); *H02H 3/093* (2013.01); *H02H 7/08* (2013.01); *H02H 7/12* (2013.01); *H02H 7/1227* (2013.01); *H02H 7/222* (2013.01); *H02P 23/14* (2013.01)

(58) Field of Classification Search
USPC ........................................................ 318/445
See application file for complete search history.

(56) References Cited

U.S. PATENT DOCUMENTS

| | | | |
|---|---|---|---|
| 2005/0123408 | A1 | 6/2005 | Koehl |
| 2005/0286181 | A1 | 12/2005 | Ochiai |
| 2006/0203409 | A1 | 9/2006 | Grisoni |
| 2009/0310270 | A1* | 12/2009 | Burns .................... H02H 3/066 361/90 |
| 2017/0294774 | A1* | 10/2017 | Illing ..................... H03M 1/12 |
| 2021/0328538 | A1* | 10/2021 | Ichiki .................... H02P 29/027 |

FOREIGN PATENT DOCUMENTS

| | | |
|---|---|---|
| DE | 198 39 617 A1 | 3/2000 |
| DE | 10 2006 019 467 A1 | 10/2007 |
| DE | 11 2014 006 358 T5 | 10/2016 |
| DE | 10 2016 116 400 A1 | 3/2018 |
| EP | 0 473 428 A2 | 3/1992 |
| WO | 2017/068574 A1 | 4/2017 |
| WO | 2017/127012 A1 | 7/2017 |

OTHER PUBLICATIONS

International Search Report corresponding to PCT Application No. PCT/EP2020/054538, dated May 27, 2020 (17 bages).

Extended European Search Report corresponding to PCT Application No. PCT/EP2020/054538, dated May 27, 2020 (19 pages).

* cited by examiner

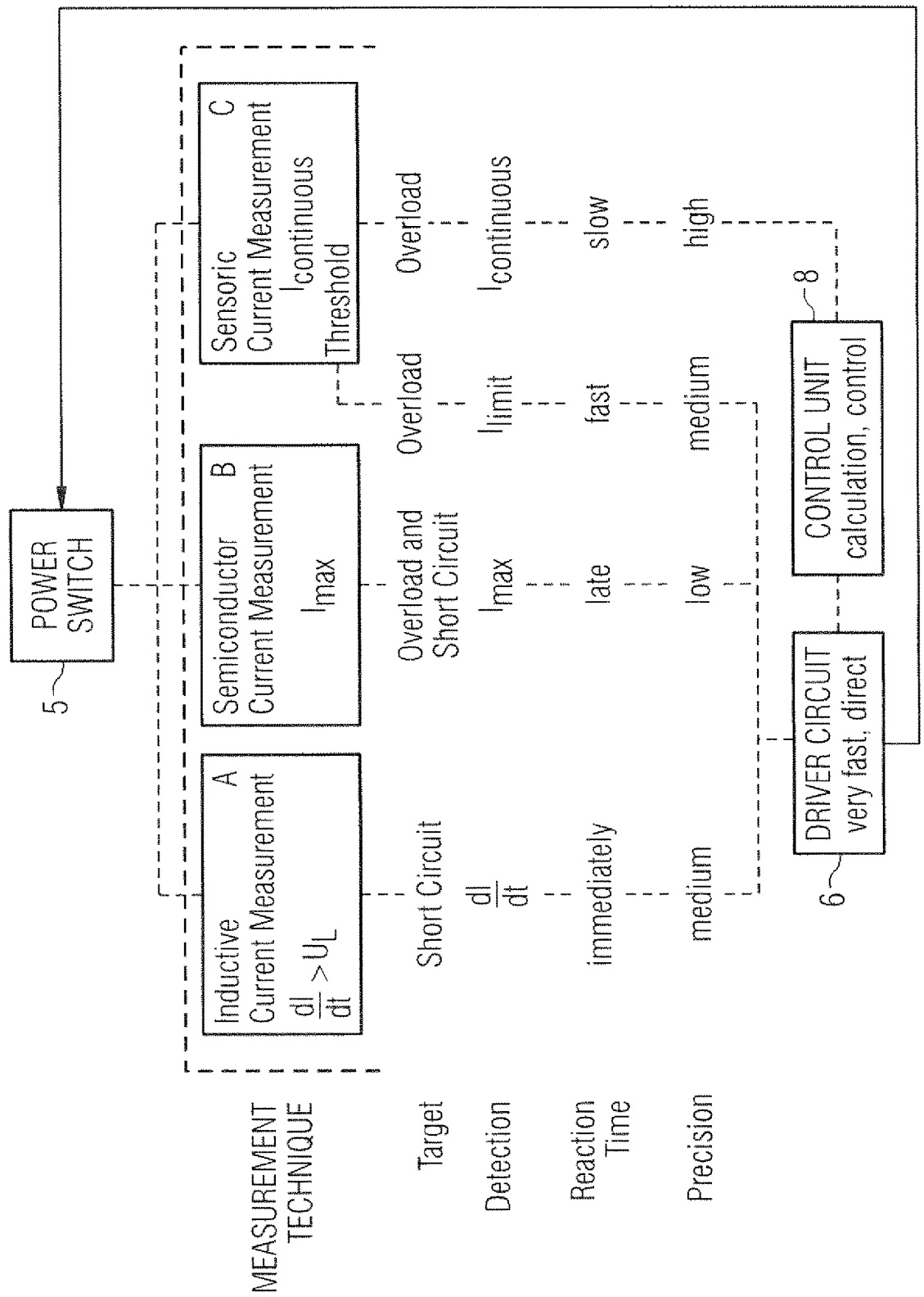

MOTOR CONTROL APPARATUS FOR CONTROLLING A POWER SUPPLY TO AN ELECTRICAL MOTOR

PRIORITY CLAIM

This application is a national stage of PCT/EP2020/054538, filed on Feb. 20, 2020, which claims priority to European Patent Application No. EP19158869.8, filed on Feb. 22, 2019, the entire disclosures of which are incorporated herein by reference.

TECHNICAL FIELD

The invention relates to a motor control apparatus for controlling a power supply to an electrical multiphase AC motor.

TECHNICAL BACKGROUND

DE 11 2014 006 358 T5 describes a power converting circuit comprising several gate control circuits to control semiconductor switches. An output of an inductivity provides a voltage measurement signal for a differential amplifier circuit and a comparator. The measurement signal includes a voltage drop along a coil.

US 2009/0310270 A1 describes a fast-responding short circuit protection system with self-reset for use in a circuit supplied by a DC power which is provided by a battery.

US 2005/0286181 A1 describes a power supply apparatus capable of detecting an abnormality in a current flowing in a drive circuit.

Most electrical motors operate through the interaction between the motor's magnetic field and an electrical current in a wire winding to generate a mechanical force in form of a rotation of a shaft. Electrical motors in general can be powered by direct current sources such as batteries or rectifiers or by alternating current sources such as a power grid, an inverter or an electrical generator. There are different kinds of electrical motors, in particular asynchronous motors and synchronous motors. Loads, in particular electrical motors, connected to a power supply system require overload and/or overcurrent protection. In an electrical system, a situation may occur where an overcurrent flows through an electrical conductor leading to an excessive generation of heat and damaging the electrical equipment or load. There can be many different causes for causing an overcurrent including short circuits, an incorrect circuit design or ground faults. Further, there exists a variety of conventional overcurrent protection devices such as fuses, electromechanical circuit breakers or solid-state power switches. Fuses do melt when an overcurrent occurs thus interrupting the electrical current and consequently protecting the connected load. However, fuses are melting only at relatively high current amplitudes so that much electrical energy can be transferred to the connected load such as an electrical motor before the fuse does melt. This increases the risk of damaging components of the connected electrical motor. Further, after the cause of the overcurrent has been cleared it is necessary to replace the affected fuse.

An electrical motor can comprise a rated power. In electrical engineering, the power rating of an equipment is the highest power input allowed to flow through the respective equipment. Overcurrent protection protects electrical equipment against excessive currents or currents beyond the acceptable current ratings, which can result from short circuits, ground faults and overload conditions. In contrast, overload protection protects against a situation where overload current causes overheating of the protected electrical equipment.

An overcurrent relay can be used as overload (thermal) protection to protect resistive loads. However, for motor loads, the overcurrent relay cannot serve as overload protection. Overload relays usually have a longer time-setting than overcurrent relays.

Electrical protection devices can employ current sensors to measure an electrical current flowing to the connected load to detect a critical situation and to trigger automatically an electronic or electromechanical switch in case that a critical situation does arise. A current measurement element such as a Hall sensor may measure the electrical current and supply the measurement values to a controller or control logic which can switch off the switching component in case that the measured current exceeds a predetermined threshold value. Conventional protection sensors use semiconductor switches such as MOSFETs to protect connected loads against overcurrents. With increasing electrical currents flowing via the switched-on semiconductor switch, the voltage drop along the semiconductor switch does also increase so that there occurs a higher power loss at the semiconductor switch. Increasing power loss can cause damaging and even destruction of the semiconductor switch and/or electronic components within the connected electrical motor. Therefore, conventional protection circuits evaluate the voltage drop along its semiconductor switch and can switch off the semiconductor switch as soon as the voltage drop exceeds a threshold value. However, this conventional switch-off mechanism comes into operation only after the electrical current has already reached a high amplitude after a relatively long switch-off period. These conventional protection circuits work comparatively slow and require a high current level to trigger the respective switching component.

An electrical motor receives electrical power from a voltage supply system and converts it into mechanical power, i.e., into speed and torque. If an electrical motor were to operate without losses the output mechanical power would correspond to the input electrical power. Further, electrical motors can have inrush electrical currents which exceed the operational currents. Consequently, it is often necessary to control the electrical power supplied to the connected electrical motor to temporarily reduce the electrical current surge of the electrical equipment during a start-up of the electrical motor. This reduces the mechanical stress on the electrical motor and shaft as well as the electrodynamic stresses on attached power cables and electrical distribution networks thus extending the lifespan of the affected system.

Accordingly, there is a need to provide an apparatus which is adapted to control a power supply to an electrical motor and which protects the connected electrical motor efficiently.

SUMMARY OF THE INVENTION

The invention provides according to a first aspect a motor control apparatus is provided for controlling a power supply to the electrical multiphase AC motor, the motor control apparatus comprising an overcurrent protection circuit having at least one input terminal adapted to receive a phase supply voltage from a power supply network and having a power switch through which the electrical multiphase AC motor is adapted to receive an electrical load current and having a current rise speed sensor component connected in series with the power switch of the overcurrent protection circuit, wherein the current rise speed sensor component of the overcurrent protection circuit is adapted to generate directly a voltage drop corresponding to the current rise speed of the electrical load current flowing from the input terminal of the motor control apparatus via the current rise speed sensor component and the power switch to the output terminal, the overcurrent protection circuit further having a driver circuit which is adapted to detect an occurring overcurrent depending on the voltage drop generated by the current rise speed sensor component and depending on a non-linear voltage drop along the power switch and which is adapted to switch off the power switch upon detection of an overcurrent within a predefined switch-off period, wherein the driver circuit is adapted to operate independently from a control unit of the motor control apparatus to provide protection against an overcurrent by switching off the power switch if the generated voltage drop plus the voltage drop along the power switch applied as a sum voltage to an input of the driver circuit exceeds a configurable threshold voltage.

The motor control apparatus further comprises in a preferred embodiment a power supply control circuit having a voltage sensor component adapted to measure at the input terminal the received phase supply voltage notified to the control unit of the motor control apparatus to provide a supply voltage profile, wherein the control unit is adapted to control an electrical power supplied to the electrical multiphase AC motor depending on an observed operation mode of the electrical multiphase AC motor.

The operation mode of the electrical multiphase AC motor can be determined by a processor or FPGA circuit of the control unit by processing the supply voltage profile and a load current profile.

In a possible embodiment of the motor control apparatus according to the first aspect of the present invention a switch-off period of less than 1 millisecond is predefined by a hardware circuitry connecting the current rise speed sensor component to the driver circuit and by internal propagation delays caused by gates and comparators integrated in the driver circuit.

In a possible embodiment of the motor control apparatus according to the first aspect of the present invention the motor control apparatus further comprises an overload protection circuit having a load current sensor component adapted to measure continuously the load current flowing to the output terminal notified to the control unit of the motor control apparatus to provide the load current profile.

In a possible embodiment of the motor control apparatus according to the first aspect of the present invention the control unit s adapted to determine an overload state of the electrical multiphase AC motor on the basis of the measured load current profile and the control unit is adapted to control the driver circuit to switch-off the power switch if an overload state of the electrical multiphase AC motor is determined by the control unit.

In a possible embodiment of the motor control apparatus according to the first aspect of the present invention the control unit of the motor control apparatus is adapted to perform a phase angle control of the electrical power supplied to the electrical multiphase AC motor depending on the observed determined operation mode of the electrical multiphase AC motor and depending on a power factor (cos φ) calculated on the basis of the load current profile measured by the load current sensor component of the overload protection circuit and on the basis of the supply voltage profile measured by the voltage sensor component of the power supply control circuit at the input terminal of the motor control apparatus.

In a possible embodiment of the motor control apparatus according to the first aspect of the present invention the current rise speed sensor component of the overcurrent protection circuit comprises a coil which is adapted to generate an induction voltage drop depending on the current rise speed of the load current flowing through the current rise speed sensor component of the overcurrent protection circuit or the current rise speed sensor of the overcurrent protection circuit comprises a resistor having a temperature-dependent resistance configured to the physical limitations of the associated power switch.

In a possible embodiment of the motor control apparatus according to the first aspect of the present invention the load current sensor component of the overload protection circuit comprises a Hall sensor, a GMR sensor, a transformer or a shunt resistor adapted to measure continuously the load current flowing to the output terminal of the motor control apparatus to provide the load current profile.

In a possible embodiment of the motor control apparatus according to the first aspect of the present invention the voltage sensor component of the power supply control circuit is adapted to supply a fraction of the supply voltage at the input terminal to the control unit of the motor control apparatus to provide the supply voltage profile.

In a possible embodiment of the motor control apparatus according to the first aspect of the present the load current sensor component of the overload protection circuit and the voltage sensor component of the power supply control circuit are connected to associated analog-to-digital converters adapted to convert the measured analog load current profile and the measured supply voltage profile into corresponding measurement values stored in a data memory of the control unit as load current profile data and supply voltage profile data.

In a possible embodiment of the motor control apparatus according to the first aspect of the present invention wherein a processor or FPGA of the control unit is adapted to calculate a power factor (cos φ) on the basis of the load current profile data and the supply voltage profile data stored in the data memory of the control unit.

In a possible embodiment of the motor control apparatus according to the first aspect of the present invention the electrical multiphase AC motor comprises as operation modes:
  an idle operation mode (mode 0) wherein the electrical multiphase AC motor is switched off and the rotation speed of the electrical multiphase AC motor is zero,
  a start operation mode (mode 1) wherein the electrical multiphase AC motor is started and the rotation speed of the electrical multiphase AC motor is increased,
  a steady-state operation mode (mode 2) wherein the rotation speed of the electrical multiphase AC motor is maintained constant, and
  a stop operation mode (mode 3) wherein the electrical multiphase AC motor is stopped and the rotation speed of the electrical multiphase AC motor is decreased.

In a possible embodiment of the motor control apparatus according to the first aspect of the present invention the processor or FPGA of the control unit is adapted to determine an operation mode of the connected electrical multiphase AC motor by processing the load current profile data and the supply voltage profile data stored in the data memory of the control unit.

In a possible embodiment of the motor control apparatus according to the first aspect of the present invention the control unit is adapted to control the driver circuit of the motor control apparatus on reception of a control command such that the power switch is switched either on or off according to the received control command.

In a possible embodiment of the motor control apparatus according to the first aspect of the present invention the control unit of the motor control apparatus is adapted to receive the control command from a user or data interface of the motor control apparatus, from a computer connected to the motor control apparatus or from a stored program control of an automation system.

In a possible embodiment of the motor control apparatus according to the first aspect of the present invention the power switch comprises an IGBT or a power MOSFET, in particular a SiC MOSFET, a GaN MOSFET or a ScAlN MOSFET.

In a possible embodiment of the motor control apparatus according to the first aspect of the present invention the control unit of the motor control apparatus is adapted to derive based on at least one operation parameter of the connected electrical multiphase AC motor and the stored profile data a temperature profile of components of the electrical multiphase AC motor and is adapted to control the driver circuit to switch off the power switch if a deviation of the derived temperature pro-file from a predetermined temperature range is detected.

In a possible embodiment of the motor control apparatus according to the first aspect of the present the power switch is switched on after a configurable wait period and/or after successful clearance of a switch-off cause and/or if other predetermined switch-on conditions are fulfilled.

In a possible embodiment of the motor control apparatus according to the first aspect of the present invention the electrical AC motor comprises a multiphase motor which receives via the motor control apparatus several electric current phases as operation load currents.

In a possible embodiment of the motor control apparatus according to the first aspect of the present invention the motor control apparatus comprises different input terminals provided for different phases phase supply voltages of the power supply network, wherein each input terminal is connected via a signal path to an output terminal, wherein each signal path comprises pairs of power switches and associated current rise speed sensor components, wherein the pair of power switches provided in the signal path between the input terminal and the output terminal comprises a first power switch provided for a positive current half-wave of an AC current and a second power switch provided for a negative current half-wave of an AC current.

In a possible embodiment of the motor control apparatus according to the first aspect of the present invention the driver circuit comprises a low voltage side connected to the control unit and a high voltage side connected to the power switch, wherein the low voltage side and the high voltage side of the driver circuit are galvanically separated from each other.

In a possible embodiment of the motor control apparatus according to the first aspect of the present invention the control unit is adapted to perform a phase angle control or to apply a predefined switching pattern to the power switch depending on the calculated power factor (cos φ) and the observed determined operation mode of the electrical multiphase AC motor.

In a possible embodiment of the motor control apparatus according to the first aspect of the present invention the processor or FPGA of the control unit has access to at least one motor operation characteristic of the connected electrical multiphase AC motor stored in a load characteristic memory of the control unit indicating for operation parameters at least one admissible operation zone, at least one critical operation zone and/or at least one inadmissible operation zone.

In a possible embodiment of the motor control apparatus according to the first aspect of the present invention the operation parameters comprise as a first operation parameter a ratio between a load current and a rated current of the electrical multiphase AC motor and as a second operation parameter time.

In a possible embodiment of the motor control apparatus according to the first aspect of the present invention the processor or FPGA of the control unit is adapted to evaluate the load current profile data and the supply voltage profile data stored in the data memory of the control unit with respect to the motor operation characteristics of the connected electrical multiphase AC motor stored in the load characteristic memory to determine whether operation parameter combinations of different operation parameters are in a critical or inadmissible operation zone of the stored motor operation characteristic.

In a possible embodiment of the motor control apparatus according to the first aspect of the present invention the control unit is adapted to output a warning signal via an output interface of the user or data interface of the motor control apparatus if an operation parameter combination of the operation parameters is determined to be in a critical operation zone of the motor operation characteristic of the electrical multiphase AC motor stored in the load characteristic memory of the control unit.

In a possible embodiment of the motor control apparatus according to the first aspect of the present invention the control unit is adapted to generate automatically a switch-off control signal applied to the power switch to switch off the load current if an operation parameter combination of operation parameters is determined to be in an inadmissible operation zone of the motor operation characteristic of the electrical multiphase AC motor stored in the load characteristic memory of the control unit.

In a possible embodiment of the motor control apparatus according to the first aspect of the present invention the control unit of the motor control apparatus is adapted to determine whether the received phase supply voltages at different input terminals and/or load currents provided for different phases at different output terminals indicate a symmetrical power supply of the connected electrical multiphase AC motor by the power supply network connected to the input terminals of the motor control apparatus on the basis of the supply voltage profile data stored in the data memory of the control unit.

In a possible embodiment of the motor control apparatus according to the first aspect of the present invention the control unit of the motor control apparatus is adapted to determine whether an electrical multiphase AC motor is connected to the output terminal on the basis of the profile data stored in the data memory of the control unit.

In a possible embodiment of the motor control apparatus according to the first aspect of the present invention In a possible embodiment of the motor control apparatus according to the first aspect of the present invention the control unit is adapted to switch off automatically the power switches if an unsymmetrical power supply of the motor control apparatus by the power supply network or an unsymmetrical power supply of the electrical multiphase AC motor by the motor control apparatus is recognized by the control unit.

In a possible embodiment of the motor control apparatus according to the first aspect of the present invention the configurable threshold voltage of the driver circuit is 9 Volts.

In a possible embodiment of the motor control apparatus according to the first aspect of the present invention the driver circuit is an integrated circuit chip, wherein the sum voltage is applied to only one pin of the integrated circuit chip.

In a possible embodiment of the motor control apparatus according to the first aspect of the present invention a relay circuit is connected in series with the power switch.

The invention provides to a further aspect an automation system comprising at least one motor control apparatus according to the first aspect of the present invention, wherein the motor control apparatus is provided for controlling a power supply to an electrical multiphase AC motor of the automation system, wherein the electrical AC motor comprises an asynchronous or synchronous multiphase AC motor.

The invention provides according to a further aspect a method for controlling a power supply to an electrical AC motor comprising the steps of:
  generating a voltage drop at a current rise speed sensor component corresponding to a current rise speed of an electrical load current flowing via the current rise speed sensor component and a power switch to the electrical AC motor;
  switching the power switch automatically off within a predefined switch-off period by a driver circuit if the generated voltage drop plus a voltage drop along the power switch applied as a sum voltage to an input of the driver circuit exceeds a configurable threshold voltage, wherein the driver circuit operates independently from a control unit to provide protection against an overcurrent; and
  controlling an electrical power supplied to the electrical AC motor depending on an observed operation mode of the electrical AC motor determined on the basis of a measured load current profile and a measured supply voltage profile.

In a possible embodiment of the method according to the present invention the predefined switch-off period is less than 1 millisecond.

In a possible embodiment of the method according to the pre-sent invention the predefined switch-off period is in a range between 2 microseconds and 1 millisecond and is predefined by a circuitry connecting the current rise speed sensor component to the driver circuit and by the internal propagation delays caused by gates and components integrated in the driver circuit.

The invention provides according to a further aspect an electrical multiphase AC motor comprising an integrated motor control apparatus according to the first aspect of the present invention.

The invention provides according to a further aspect a busbar system comprising a motor control apparatus according to the first aspect of the present invention having at least one input terminal connected to busbars of the busbar system.

The invention provides to a further aspect a fuse housing, in particular a NH fuse housing, comprising an integrated motor control apparatus according to the first aspect of the present invention.

The invention provides to a further aspect a plug device pluggable into a socket of an electrical multiphase AC motor, the plug device comprising an integrated motor control apparatus according to the first aspect of the present invention.

BRIEF DESCRIPTION OF THE FIGURES

In the following, possible embodiments of the different aspects of the present invention are described in detail with respect to the enclosed figures.

FIG. 11 shows schematically possible different redundant measurement and protection mechanisms employed by a motor control apparatus according to the present invention.

DETAILED DESCRIPTION OF EMBODIMENTS

Figure 1:
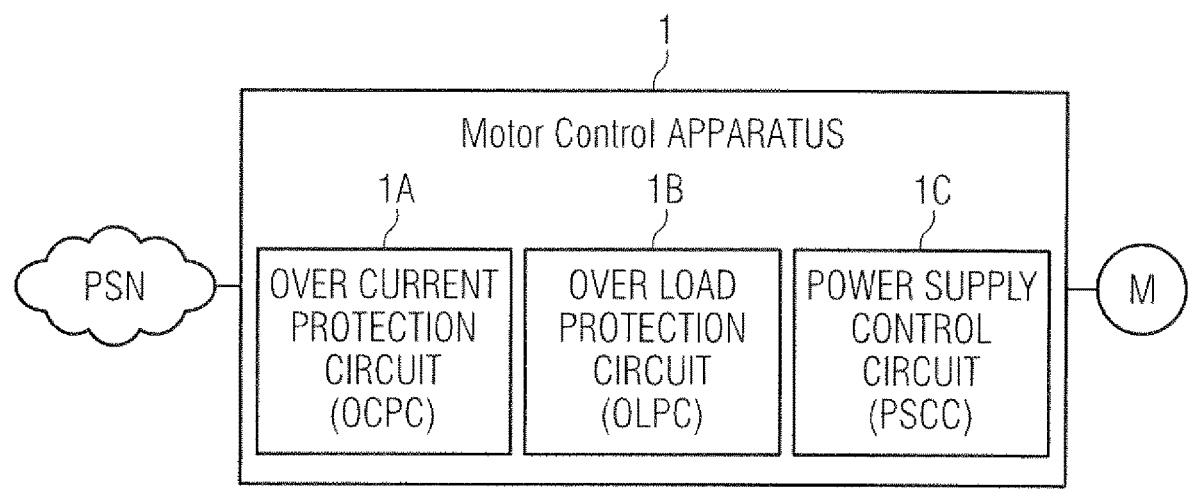
FIG. 1 shows a block diagram of a possible exemplary embodiment of a motor control apparatus according to the first aspect of the present invention.

As can be seen from the block diagram of FIG. 1, a motor control apparatus 1 according to the first aspect of the present invention can comprise several main circuits including an overcurrent protection circuit 1A, an overload protection circuit 1B and a power supply control circuit 1C. The motor control apparatus 1 can be provided between a power supply network PSN and an electrical motor M as a load as illustrated in FIG. 1. The electrical motor M is connected to an output terminal 3 of the motor control apparatus 1. In a possible embodiment, the motor control apparatus 1 comprises an overcurrent protection circuit 1A and a power supply control circuit 1C. In a still further possible embodiment, the motor control apparatus 1 comprises an overcurrent protection circuit 1A, an overload protection circuit 1B and a power supply control circuit 1C as shown in FIG. 1 and FIG. 2.

Figure 2:
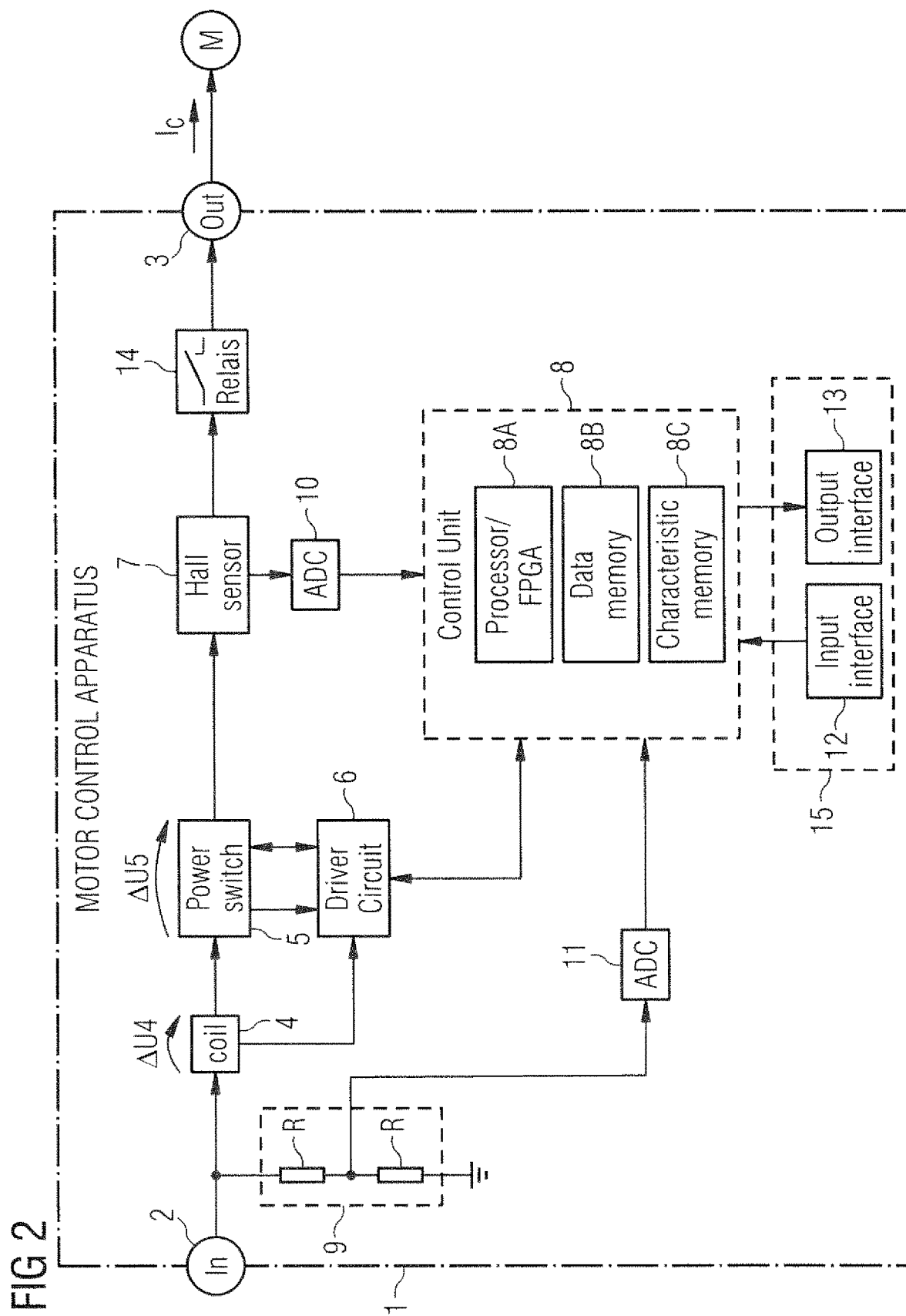
FIG. 2 shows a block diagram of a possible exemplary embodiment of a motor control apparatus according to the first aspect of the present invention.

FIG. 2 shows a possible embodiment of a motor control apparatus 1 including an overcurrent protection circuit 1A, an overload protection circuit 1B and a power supply control circuit 1C. The overcurrent protection circuit 1A has an input terminal 2 to receive electrical power from the power supply network PSN shown in FIG. 1. The motor control apparatus 1 further comprises an output terminal 3 used to connect an electrical motor M to the motor control apparatus 1. As can be seen in FIG. 2, a sensor component 4 is connected in series with a power switch 5. The sensor component 4 is adapted to generate directly a voltage drop $\Delta U_4$ corresponding to a current rise speed of the electrical load current $I_L$ flowing from the input terminal 2 of the motor control apparatus 1 via the sensor component 4 and the power switch 5 to the output terminal 3 of the motor control apparatus 1. The overcurrent protection circuit (OCPC) 1A includes the power switch 5 through which the electrical motor M receives the electrical load current $I_L$ and the sensor component 4 connected in series with the power switch 5. In a possible embodiment, the sensor component 4 of the overcurrent protection circuit 1A comprises a coil which is adapted to generate an induction voltage drop $\Delta U_4$ depending on the current rise speed of the load current $I_L$ flowing through the sensor component 4 of the overcurrent protection circuit 1A. The overcurrent protection circuit 1A further comprises a driver circuit 6 as shown in the block diagram of FIG. 2. The driver circuit 6 is adapted to detect an occurring overcurrent depending on the voltage drop $\Delta U_4$ generated by the sensor component 4 and a voltage drop $\Delta U_5$ along the power switch 5. The voltage drop $\Delta U_4$ generated by the sensor component 4 and the voltage drop $\Delta U_5$ along the power switch 5 is applied to the driver circuit 6 as a sum voltage $U_\Sigma = \Delta U_4 + \Delta U_5$. The hardwired driver circuit 6 is adapted to switch off the power switch 5 upon detection of an overcurrent with a switch-off period of less than one millisecond. In a preferred embodiment the switch-off period is less than 5 microseconds. The voltage drop $\Delta U_5$ on the power switch 5 is used as a value representative of the momentary current in the sum voltage $U_\Sigma$. In a possible implementation the voltage drop $\Delta U_5$ at the power switch 5 is non-linear. The voltage drop $\Delta U_5$ may also be linear.

The protected switch-off is responsive to a combination of both of the value of the current and to the value of the rate of change of the current.

The motor control apparatus 1 according to the present invention further comprises in the illustrated embodiment of FIG. 2 a power supply control circuit (PSCC) 1C. The power supply control circuit 1C comprises at least one sensor component 9 adapted to measure at the input terminal 2 of the motor control apparatus 1 a supply voltage Vin notified to a control unit 8 of the motor control apparatus 1. The control unit 8 is adapted to control the electrical power supplied to the electrical motor M depending on an operation mode of the electrical motor M. In the illustrated embodiment of FIG. 2, the power supply control circuit 1C has a sensor component 9 formed by a voltage divider adapted to supply a fraction of the supply voltage Vin at the input terminal 2 of the motor control apparatus 1 to the control unit 8 of the motor control apparatus 1 to provide a supply voltage profile over time.

Further in the embodiment of FIG. 2, the motor control apparatus 1 also comprises an overload protection circuit 1B having a sensor component 7 adapted to measure continuously the load current $I_L$ flowing to the output terminal 3. The measured load current $I_L$ is notified by the sensor component 7 to the control unit 8 of the motor control apparatus 1 which is adapted to determine an overload state of the electrical motor M on the basis of the measured load current profile. The sensor component 7 can also provide measurements to the driver circuit 6 for fault detection. The control unit 8 of the motor control apparatus 1 is further adapted to control the driver circuit 6 to switch off the power switch 5 automatically if an overload state of the electrical motor M has been determined by the control unit 8. As can be seen in FIG. 2, the sensor component 7 of the overload protection circuit 1B and the sensor component 9 of the power supply control circuit 1C are both connected to associated analog-to-digital converters 10, 11. The analog-to-digital converters 10, 11 are adapted to convert the measured analog load current profile received from the sensor component 7 and the measured supply voltage profile measured by the sensor component 9 into corresponding measurement values (samples). The analog-to-digital converters 10, 11 can also form part of a processor 8A of the control unit 8. The sampling rate can e.g., be 4 kHz. The resolution may comprise 12 or more bits. The measurement values provided by the analog-to-digital converters 10, 11 are stored as data samples in a data memory of the control unit 8 as load current profile data and as supply voltage profile data. In the illustrated embodiment of FIG. 2, the control unit 8 comprises a processor or FPGA-circuit 8A and a data memory 8B to store on the fly during operation load current profile data and supply voltage profile data. The control unit 8 can further comprise a memory 8C to store different motor operation characteristics, i.e., operation characteristics for different operation parameters and/or for different types of motors M. In the embodiment shown in FIG. 2 the sensor component 7 comprises a Hall-sensor. Other current measurement components are possible, e.g., a GMR sensor, a shunt resistor or a transformer.

The control unit 8 having a processor or FPGA 8A is adapted to control the electrical power supply to the electrical motor M connected to the output terminal 3 of the motor control apparatus 1 depending on the operation mode of the electrical motor M and on the basis of the load current profile measured by the sensor component 7 of the overload protection circuit 1B and on the basis of the supply voltage profile measured by the sensor component 9 of the power supply control circuit 1C at the input terminal 2 of the motor control apparatus 1. In a possible embodiment, the sensor component 7 of the overload protection circuit 1B comprises a Hall sensor or GMR sensor adapted to measure continuously the load current $I_L$ flowing to the output terminal 3 of the motor control apparatus 1 to provide the load current profile. Also, a transformer or resistor can be used to provide current measurements.

The current supply of the control unit 8 can be either provided by an integrated power supply unit generating an internal power supply voltage from the received supply voltage Vin or Vra a DC power supply interface of the motor control apparatus 1.

In a possible embodiment, the processor or FPGA circuit 8A of the control unit 8 is adapted to calculate a power factor cos φ on the basis of the load current profile data and the supply voltage profile data stored in the data memory 8B of the control unit 8. The profile data can be stored for a predetermined moving time window in the data memory 8B. The firmware of the processor can be programmable for different use cases. For instance, the overload protection provided by the overload protection circuit 1B can be programmed. In contrast, the overcurrent protection provided by the overcurrent protection circuit 1A is hardwired and very fast since it does not involve the processor 8A of the control unit 8.

Figure 3:
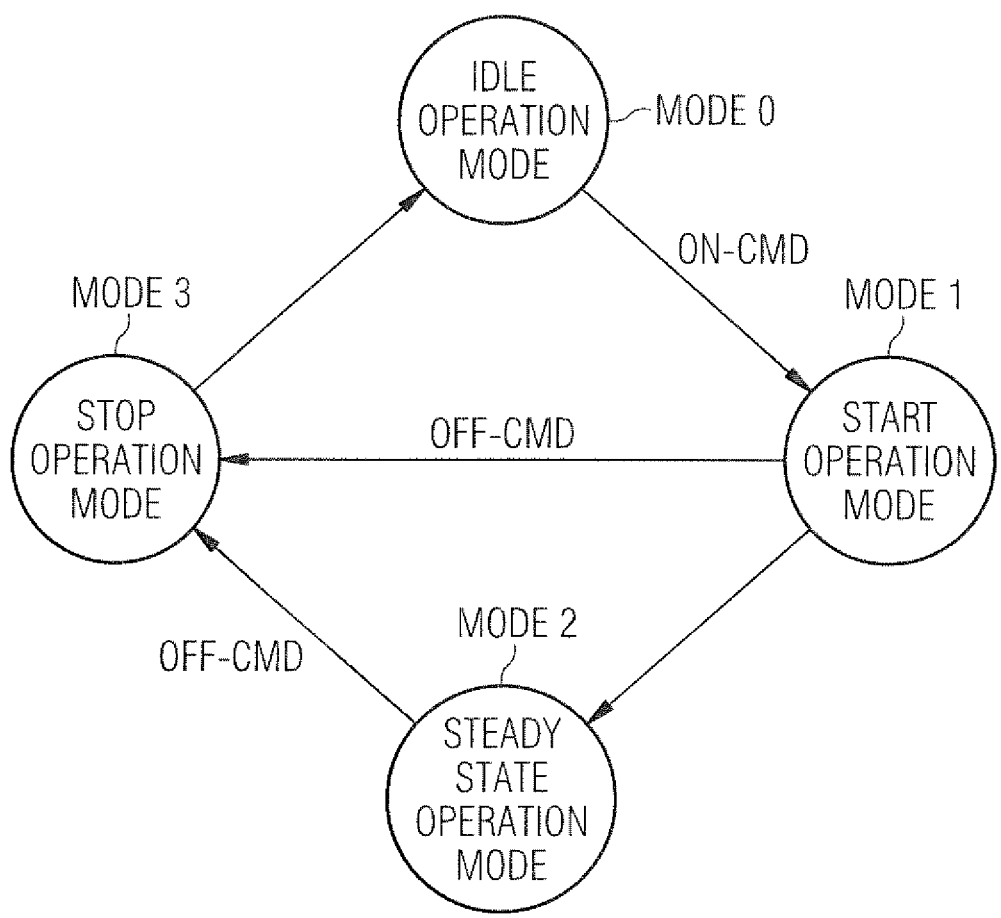
FIG. 3 shows a state diagram to illustrate a possible exemplary implementation of a motor control apparatus according to the first aspect of the present invention.

The electrical motor M connected to the output terminal 3 can comprise different operation modes. FIG. 3 shows a state diagram to illustrate different possible operation modes of the electrical motor M connected to the output terminal 3 of the motor control apparatus 1. In the illustrated example, the connected electrical motor M comprises an idle operation mode (mode Ø), a start operation mode (mode 1), a steady-state operation mode (mode 2) and a stop operation mode (mode 3). In the idle operation mode (mode Ø), the electrical motor M is switched off and the rotation speed of the electrical motor M is zero. In response to an on-command, a transition is performed from the idle operation mode into the start operation mode (mode 1). In the start operation mode, the electrical motor M is started and the rotation speed of the electrical motor M is increased. In the steady-state operation mode (mode 2) of the motor M, the rotation speed of the electrical motor M is maintained constant. Further, in a stop operation mode (mode 3), the electrical motor M is stopped and the rotation speed of the electrical motor M is decreased. In response to an off-command, either in the start operation mode or in the steady-state operation mode, the control unit 8 transits into a stop operation mode until the rotation speed of the electrical motor M becomes zero.

The processor or FPGA circuit 8A of the control unit 8 is adapted to determine the operation mode and/or a specific operation state of the connected electrical motor M by processing the load current profile data and/or the supply voltage profile data available in the data memory 8B of the control unit 8.

As also illustrated in the state diagram of FIG. 3, the control unit 8 is adapted to control the driver circuit 6 of the motor control apparatus 1 on reception of a control command CMD such that the power switch 5 is switched either on or off according to the received control command CMD. In a possible embodiment, the control unit 8 of the motor control apparatus 1 is adapted to receive the control command CMD from a user or data interface 15 of the motor control apparatus 1. In the illustrated exemplary embodiment of FIG. 2, the motor control apparatus 1 comprises an input interface 12 and an output interface 13 forming part of an interface 15. In an alternative embodiment, the control unit 8 of the motor control apparatus 1 can also receive a control command from a computer connected to the motor control apparatus 1 or from a stored program control of an automation system. A user interface 15 can be either integrated in the housing of the apparatus 1 or is connected via data interface provided at the housing of the apparatus 1.

In a possible embodiment, the control unit 8 of the motor control apparatus 1 is adapted to derive based on at least one operation parameter of the connected electrical motor M and the profile data stored in the data memory 8B an associated temperature profile of components of the electrical motor M and/or of components of the motor control apparatus 1 itself and is further adapted to control the driver circuit 6 to switch off the power switch 5 if a deviation from a predetermined temperature range has been detected. The power switch 5 of the motor control apparatus 1 can in a possible embodiment also be switched on after a configurable wait period and/or after successful clearance of a switch-off cause and/or if other predetermined switch-on conditions are fulfilled. The power switch 5 can comprise different kinds of solid-state devices including an IGBT or a power MOSFET. The power MOSFET can comprise a SiC MOSFET, a GaN MOSFET or a ScAlN MOSFET. The connected electrical motor M as shown in FIG. 2 can comprise in a possible embodiment a multiphase motor which receives via the motor control apparatus 1 several electrical current phases L as operation load currents $I_L$. In a possible implementation, the motor control apparatus 1 comprises for each electrical current phase L an overcurrent protection circuit 1A, a power supply control circuit 1C and an overload protection circuit 1B. In a possible embodiment, the electrical motor M can comprise a three-phase electrical motor M. The three-phase electrical motor M can comprise a three-phase induction motor, i.e., an asynchronous motor. The induction motor uses electrical current delivered in three phases L in a sequence into the coils of a stator to create a rotating magnetic field. This magnetic field induces an electrical field in a coil or squirrel cage to drive a rotor of the induction motor M. The difference in speed between the rotor, i.e., the synchronous speed, and the rotating magnetic field is also called the slip. A symmetrical three-phase winding system of the stator of the induction motor M is connected to a three-phase power supply network PSN with the appropriate voltage and frequency. Sinusoidal currents of the same amplitude can flow in each of the three winding phases L. Each of the electrical currents are temporarily offset from each other by 120°. Since the phases L are also spatially offset by 120°, the stator of the electrical motor M builds up a magnetic field that rotates with the frequency of the applied voltage. The rotating magnetic field induces an electrical voltage in the rotor winding or rotor bars. Short circuit currents can flow because the winding is short-circuited by a ring. Together with the rotating magnetic field, these electrical currents build mechanical forces and produce a torque over the radius of the rotor that can accelerate the rotor speed in the direction of the rotating field. In the induction motor, the frequency of the voltage generated in the rotor of the electrical motor M drops as the speed of the rotor increases. This is because the difference between the rotating field speed and the rotor speed becomes smaller. If the rotor of the electrical motor M were to turn at the same speed as the rotating magnetic field, it would rotate synchronously and no voltage would be induced and the electrical motor M would not be able to develop any torque as a result. However, the load torque and friction torque in the bearings lead to a difference between the rotor speed and the rotating magnetic field speed and this results in an equilibrium between the acceleration torque and the load torque. As a consequence, the electrical induction motor runs asynchronously and is also called an asynchronous motor.

In a possible embodiment, the motor control apparatus 1 is provided for an asynchronous induction motor M connected to the output terminal 3 of the motor control apparatus 1.

The motor control apparatus 1 according to the present invention as illustrated in FIGS. 1, 2 can also be provided for other kinds of electrical motors, in particular also for a synchronous motor. In a synchronous motor the rotating magnetic field of the stator is synchronous to the magnetic field of the rotor.

The motor control apparatus 1 according to the present invention can also be used for DC driven motors or AC motors with capacitors.

Figure 9:
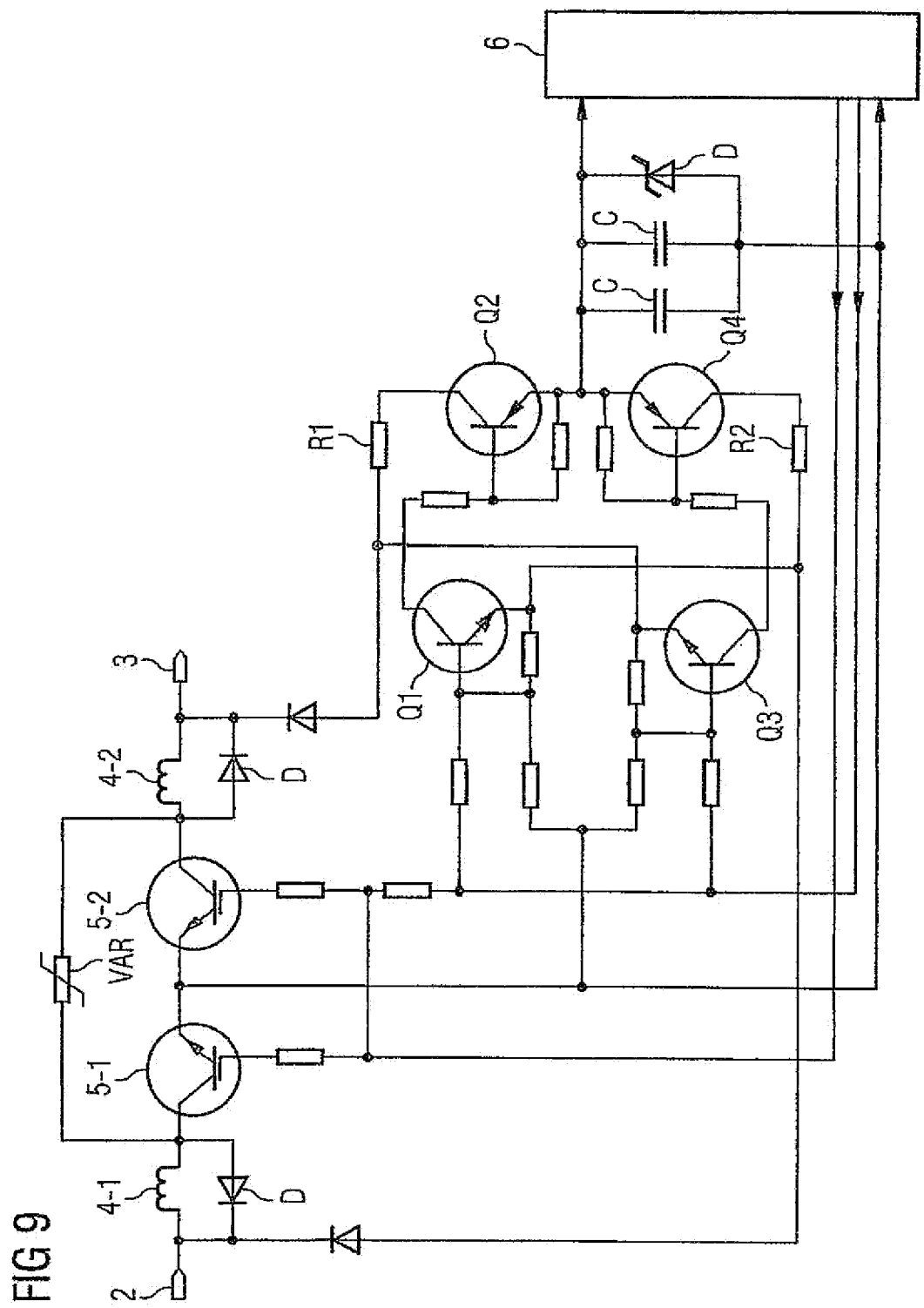
FIG. 9 shows a circuit diagram of a possible exemplary embodiment of an overcurrent protection circuit which can be used in a motor control apparatus according to the present invention.
Figure 10:
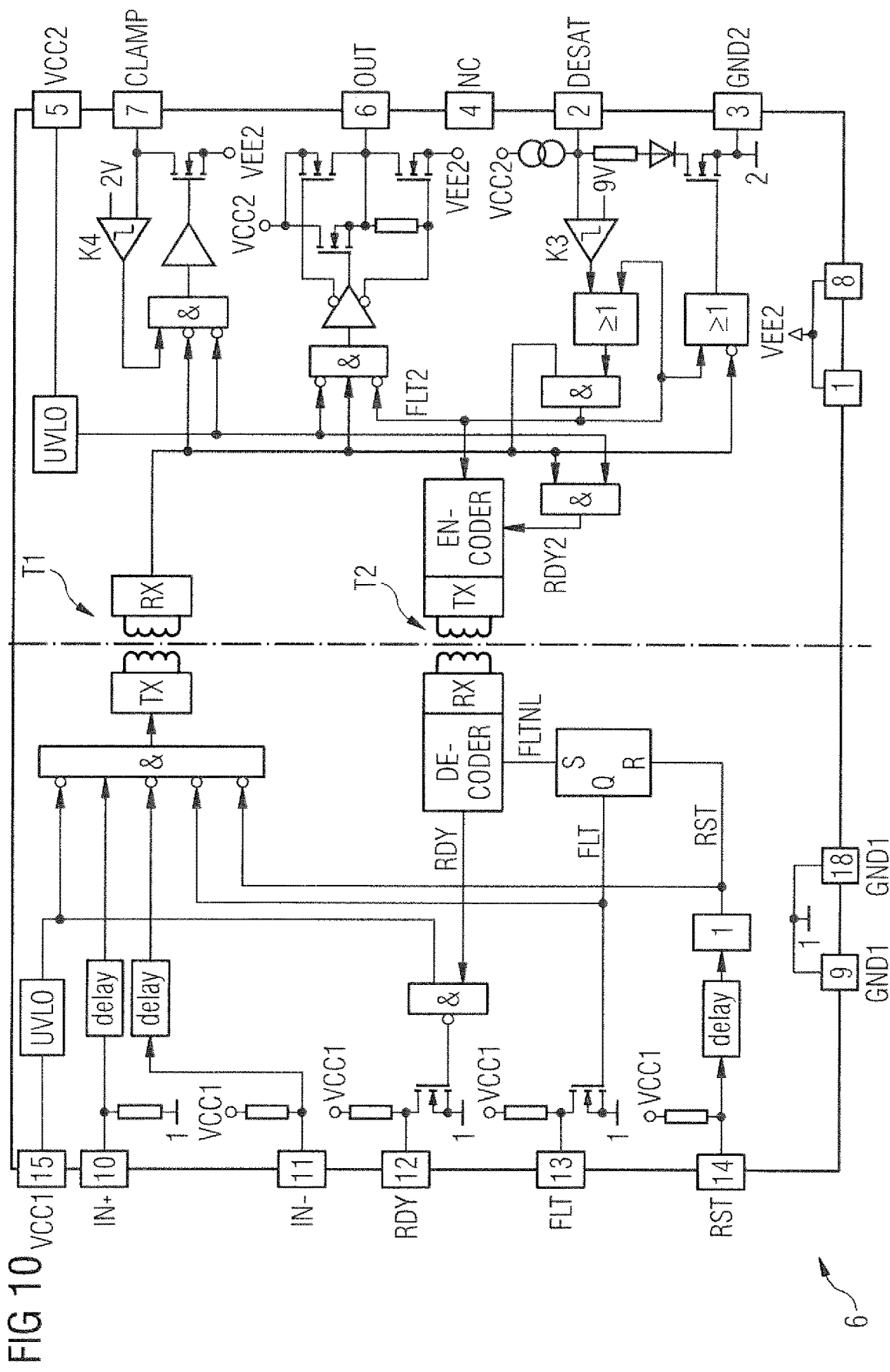
FIG. 10 shows a circuit diagram for illustrating an exemplary implementation of a driver circuit used in a motor control apparatus according to the present invention.

As also illustrated in the embodiment shown in FIG. 9, for each electrical current phase L or for each DC current direction, a first power switch 5-1 is provided for a positive current half-wave of an AC current or for a positive DC current. Further, a second power switch 5-2 can be provided for a negative current half-wave of an AC current or for a negative DC current. The power switches 5 can be connected via half-bridge or full-bridge rectifier circuits with associated driver circuits 6 of the motor control apparatus 1. As illustrated in FIG. 10, the driver circuit 6 can comprise a low voltage side connected to the control unit 8 and a high voltage side connected to the power switch 5. In a preferred embodiment, the low voltage side and the high voltage side of the driver circuit 6 are galvanically separated from each other.

In a possible embodiment of the motor control apparatus 1 according to the present invention, a processor 8A or a FPGA 8A of the control unit 8 is adapted to perform a phase angle control and/or to apply a predefined switch pattern to the power switch 5 via the driver circuit 6 depending on the calculated power factor cos φ and a current operation mode of the electrical motor M connected to the motor control apparatus 1. To this end, the processor or FPGA 8A of the control unit 8 has access to at least one motor operation characteristic of the electrical motor M indicating for operation parameters at least one admissible operation zone, at least one critical operation zone and/or at least one inadmissible operation zone.

Figure 5:
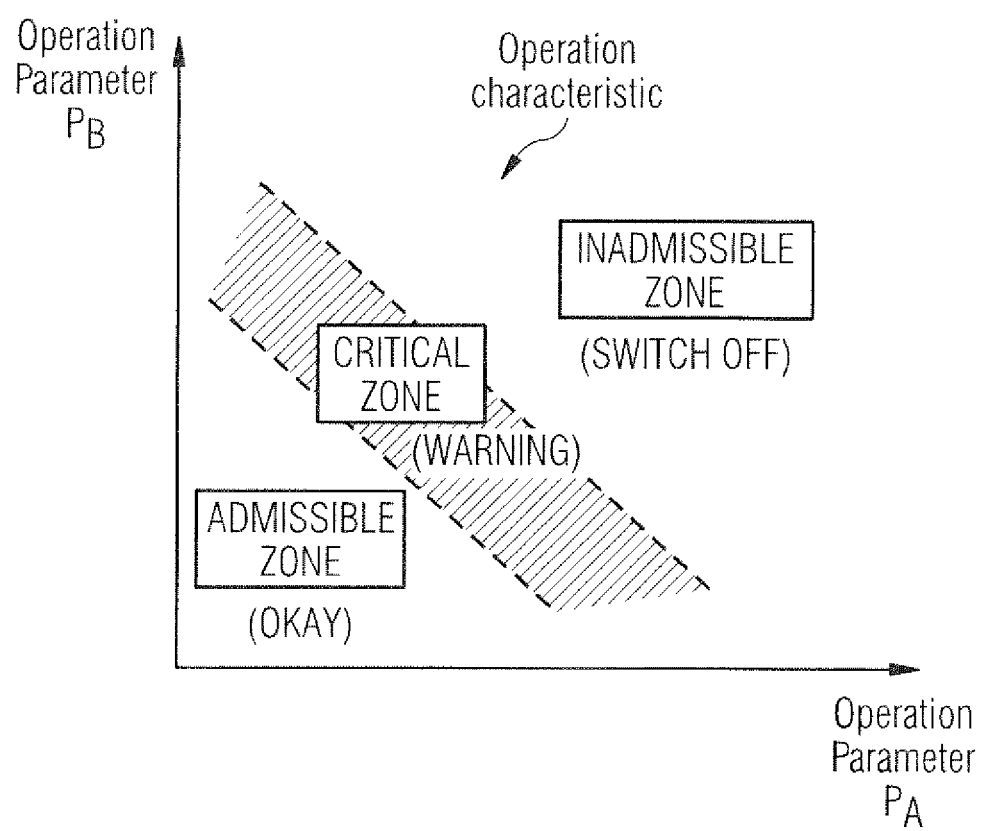
FIG. 5 illustrates schematically possible motor operation characteristics of an electrical motor connected to a motor control apparatus according to the present invention.

FIG. 5 shows schematically a motor operation characteristic for an electrical motor M to provide protection. The different zones of the motor operation characteristic can be defined by at least two operation parameters PA, PB as shown in FIG. 5.

Figure 6:
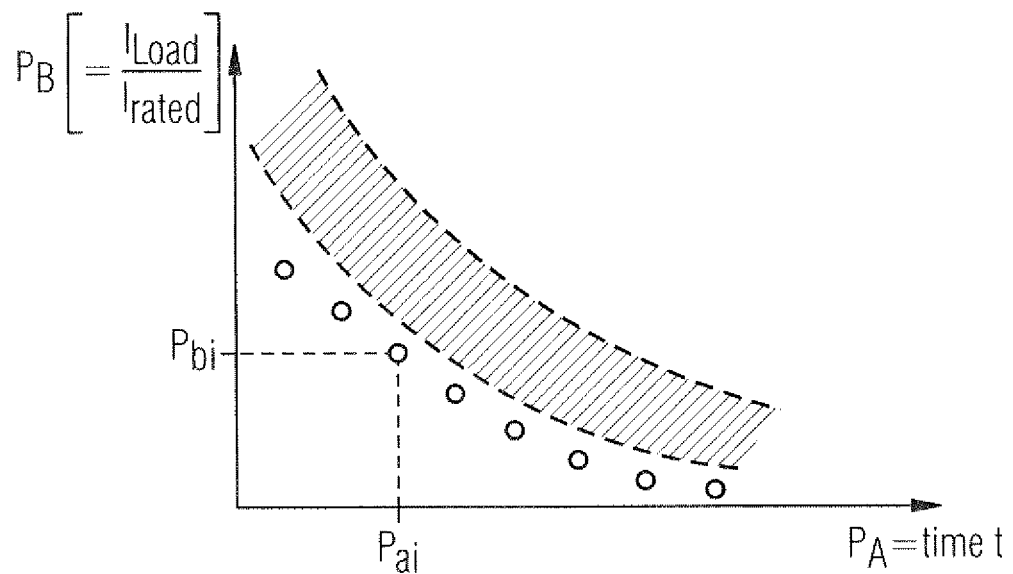
FIGS. 6, 7 show further exemplary motor operation characteristics to illustrate the operation of a motor control apparatus according to the present invention.
Figure 7:
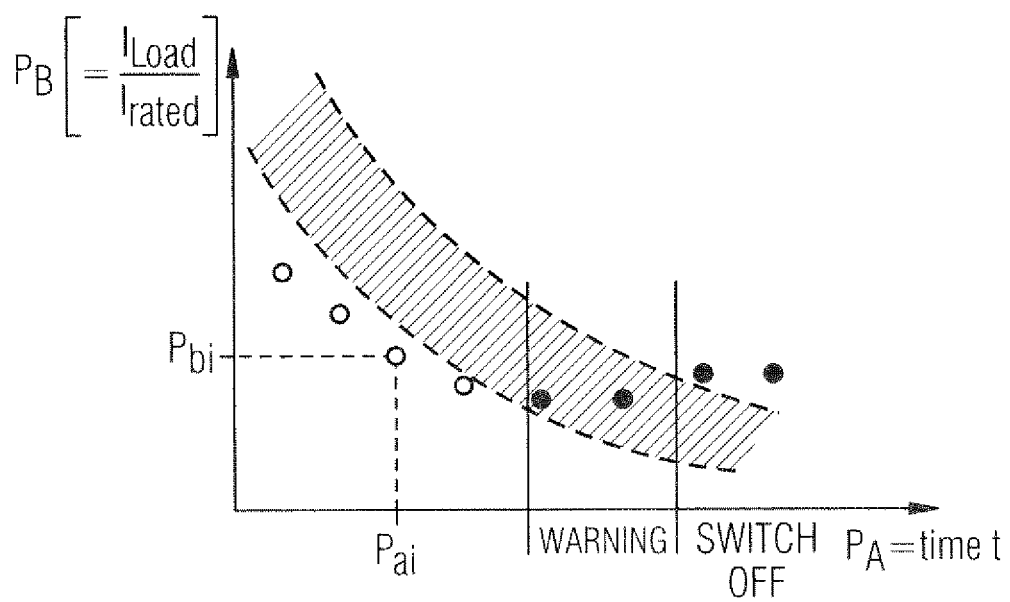

FIGS. 6, 7 show examples of a motor operation characteristic which can be stored in a memory 8C of the control unit 8 and used by the processor or FPGA 8A to provide protection of the motor M, in particular overload protection. As can be seen in FIGS. 6, 7, the processor or FPGA 8A of the control unit 8 is adapted to evaluate load current profile data and/or supply voltage profile data stored in the data memory 8B of the control unit 8 with respect to the motor operation characteristics of the electrical motor M stored in the motor characteristic memory 8C to determine whether operation parameter combinations of different operation parameters P are in a critical or inadmissible operation zone of the respective motor operation characteristic. In the example shown in FIGS. 6, 7, a parameter PB given by the ratio between the load current and the rated current is illustrated over time t to show two different scenarios. In the scenario illustrated in FIG. 6, the calculated ratio between the sampled load current and the predefined rated current provides values which are all in the admissible zone of the motor operation characteristic. In contrast, in the scenario shown in FIG. 7, the ratio values (first parameter PB) are initially in the admissible zone and then move in time (second parameter) into the critical zone and finally into an inadmissible zone as shown in FIG. 7. When the parameter PB reaches the critical zone the control unit 8 can trigger a warning signal. As soon as the operation parameter PB reaches the inadmissible zone, the processor 8A of the control unit 8 can trigger a switch-off operation mode where the power switch 5 is switched off by the driver circuit 6 in response to a control command received from the control unit 8. Alternatively, the control unit 8 may control another switch or relay connected in series to the power switch 5 to switch off the motor M in case that an inadmissible operation zone is reached. In a possible embodiment, the control unit 8 can output a warning signal via an output interface 13 of the motor control apparatus 1 as shown in FIG. 2 if an operation parameter combination of the operation parameters is determined to be in a critical operation zone of a motor operation characteristic of the respective electrical motor M. Further, the control unit 8 can generate automatically a switch-off control signal applied to the power switch 5 or to another switch (e.g., relay circuit 14) to switch off the load current $I_L$ if an operation parameter P combination of operation parameters is determined to be in an inadmissible operation zone of a motor operation characteristic of the respective electrical motor M. In a possible embodiment, different motor operation characteristics for different operation parameter combinations can be stored in the memory 8C of the control unit 8.

Any action triggered by the control unit 8 is based on several value pairs (or triples) of the parameters P of a motor operation characteristic as illustrated in FIGS. 6, 7.

In a possible embodiment, the control unit 8 of the motor control apparatus 1 is adapted to determine whether the received supply voltages Vin at different input terminals 2 provided for different phases L indicate a symmetrical power supply by the power supply network PSN connected to the input terminal 2 of the motor control apparatus 1 on the basis of the supply voltage profile data stored in the data memory 8B of the control unit 8. The control unit 8 is adapted to switch off automatically the power switches 5 at the different phases if an unsymmetrical power supply of the power supply network PSN is recognized by the control unit 8.

Figure 4:
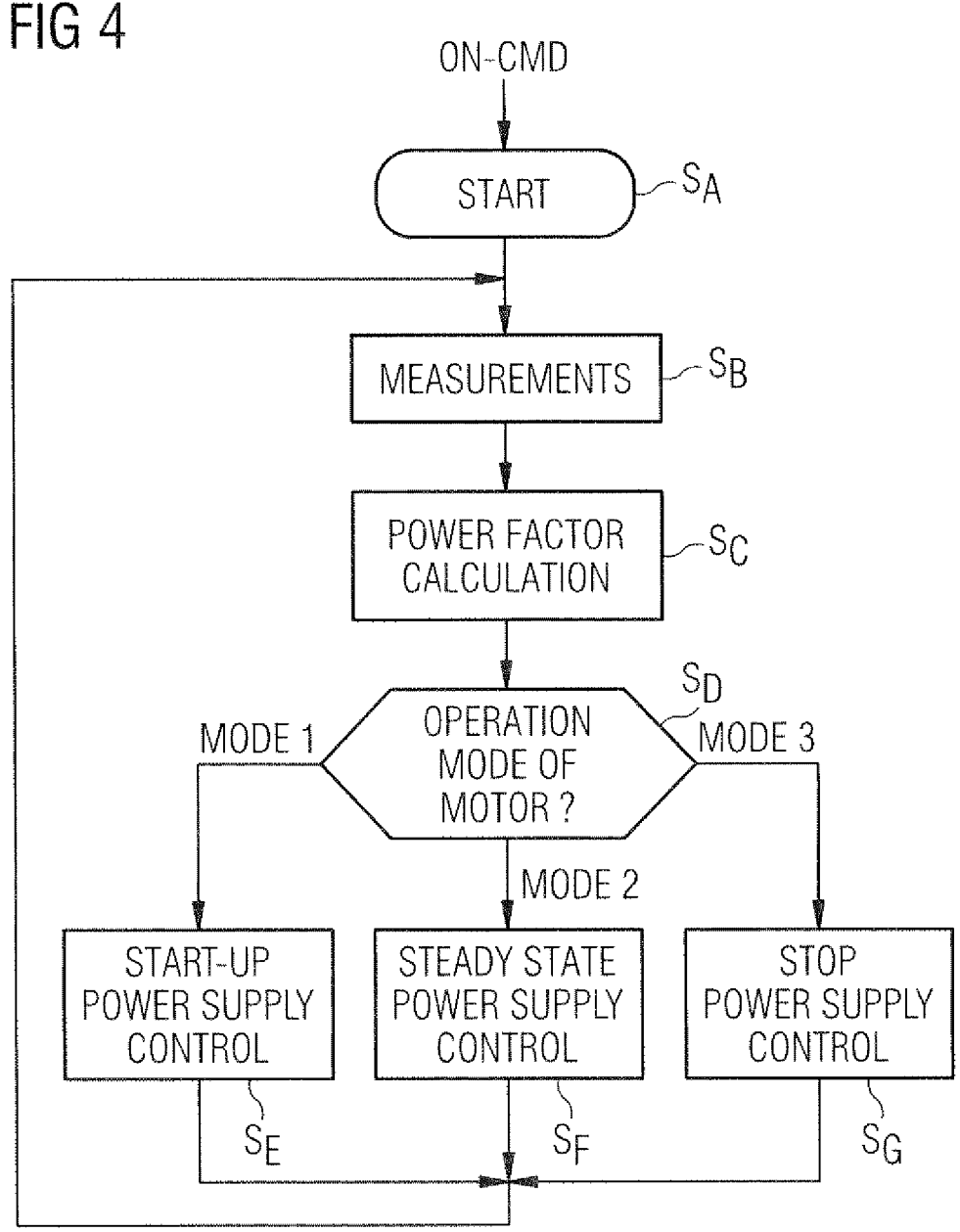
FIG. 4 shows a flowchart for illustrating a possible exemplary embodiment of a motor control apparatus according to the first aspect of the present invention.

FIG. 4 shows a flowchart to illustrate a possible exemplary embodiment of the operation of a motor control apparatus 1 according to the present invention. In response to an on-command, the connected electrical motor M is started in step $S_A$ and a transition is performed from the idle operation mode to the start operation mode.

In a first step $S_B$, measurements are performed by sensor components. For each phase L, the respective voltage U and an electrical load current $I_L$ can be measured in step $S_B$. The load current $I_L$ is measured by a sensor component 7 and the supply voltage U can be measured by the sensor component 9 of the motor control apparatus 1.

In a further step $S_C$, a power factor calculation is performed by the processor or FPGA 8A of the control unit 8. The processor or FPGA 8A of the control unit 8 is adapted to calculate the power factor cos φ on the basis of the load current profile data and the supply voltage profile data stored in the data memory 8B of the control unit 8. The power factor is defined as a ratio of real power to apparent power. As power is transferred along a transmission line it does not consist purely of real power that can do work once transferred to the electrical motor M but rather consists of a combination of real and reactive power called apparent power. The power factor describes the amount of real power transmitted along a transmission line to the connected electrical motor M relative to the total apparent power flowing in the transmission line.

In a further step SD, the current operation mode of the electrical motor M is observed. If the started electrical motor M is in the start-up operation mode (mode 1), the processor or FPGA 8A or controller of the control unit 8 performs a start-up power supply control in step $S_E$. If the electrical motor M is in the steady-state operation mode (mode 2), the processor or FPGA 8A of the control unit 8 performs a steady-state power supply control in step $S_F$. If the connected electrical motor M is in the stop operation mode (mode 3), the processor or FPGA 8A or controller of the control unit 8 performs a stop power supply control in step $S_G$ as illustrated in FIG. 4. In a possible implementation, the processor or FPGA 8A of the control unit 8 can perform in step $S_E$, $S_F$, $S_G$ a phase angle control depending on the power factor cos φ calculated in step $S_C$ and the observed current operation mode of the electrical motor M.

A phase angle control (also called phase-fired control PFC) is used for power limiting the applied AC voltage. In a possible embodiment, the control unit 8 operates the power switch 5 to perform phase angle control. The relation between the load current $I_L$ and the supply voltage can be varied by the control unit 8 by controlling the switching of the power switch 5 via the driver circuit 6. In a possible embodiment, the control unit 8 can perform a motor soft start procedure to temporarily reduce the load and torque in the power train to minimize the electrical current surge of the electrical motor M during a start-up. In this way, the control unit 8 reduces the mechanical stress of the electrical motor M. The control unit 8 can control the three-phase motor's voltage supply during the start-up phase. In this way, the equipment of the electrical motor M can be accelerated smoothly. This lengthens the service lifetime of the electrical motor M and improves its operation behavior. The control unit 8 can use the solid-state power switch 5 to control the electrical current flow and consequently the voltage applied to the electrical motor M depending on the calculated power factor and the operation mode of the electrical motor M.

Figure 8:
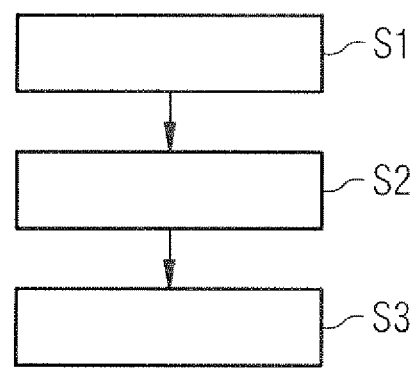
FIG. 8 shows a flowchart for illustrating controlling a power supply to an electrical motor by a motor control apparatus according to the present invention.

FIG. 8 shows a flowchart of a possible exemplary embodiment of a method for controlling a power supply to an electrical motor M according to a further aspect of the present invention.

In the illustrated embodiment of FIG. 8, the method comprises three main steps S1, S2, S3. In a first step S1, a voltage drop $\Delta U_4$ at the sensor component 4 corresponding to a current rise speed of an electrical load current $I_L$ flowing via the sensor component 4 and the power switch 5 to an electrical motor M is generated. In a possible implementation, the voltage drop $\Delta U_4$ is generated by a coil corresponding to the current rise speed of the electrical load current $I_L$.

In a further step S2, the power switch 5 is automatically switched off within a switch-off period of less than one millisecond if the generated voltage drop $\Delta U_4$ plus a voltage drop $\Delta U_5$ along the power switch 5 exceeds a threshold voltage to provide protection against an overcurrent, in particular protection against a short circuit current. In a possible embodiment a very short switch-off period of less than 5 microseconds can be achieved. In a possible implementation the switch-off period is adjustable in a predefining range of e.g., 2 microseconds to 1 millisecond.

In a further step S3, the electrical power applied to the electrical motor M is controlled depending on an operation mode of the electrical motor M on the basis of a measured load current profile and a measured supply voltage profile. The electrical power applied to the electrical motor M can be controlled in a possible embodiment by performing a phase angle control. In an alternative embodiment, the power supply control can be achieved by applying a predefined switching pattern to the power switch 5. The switching pattern can be stored in the data memory 8B of the control unit 8. Single half waves can be selected to emulate a lower AC frequency of the connected motor M. The switching patterns can be used to start the motor M slowly and/or to limit the electrical load current.

As can be seen from FIG. 2, the hardware sensor component 4 is connected in series with the power switch 5. The hardware sensor component 4 such as a coil is adapted to generate an electrical voltage corresponding to a current rise speed of the electrical current flowing via the sensor component 4 and the power switch 5 to the electrical motor M connected to the output terminal 3 of the motor control apparatus 1. The driver circuit 6 is adapted to detect an occurring overcurrent, in particular a short circuit current, depending on the voltage drop $\Delta U_4$ generated directly by the sensor component 4 and to switch off the power switch 5 automatically upon detection of an overcurrent within a very short period of time to protect the connected electrical motor M. The sensor component 4 comprises in a possible implementation a coil which is adapted to generate directly an induction voltage $U_L$ depending on a change of the electrical current I flowing through the sensor component 4 and through the power switch 5 to the connected electrical motor M. The induction voltage $U_L$ generated by the coil 4 corresponds to the current rise speed dI/dt of an electrical current I flowing via the sensor component 4 and via the power switch 5 to the respective electrical motor M. The voltage drop $\Delta U_4$ generated by the sensor component 4 and the voltage drop $\Delta U_5$ along the power switch 5 can be applied as a sum voltage $U_\Sigma$ to the driver circuit 6. In an alternative embodiment the voltage drop $\Delta U_4$ generated by the sensor component 4 and the voltage drop $\Delta U_5$ along the power switch 5 can be supplied in parallel to the driver circuit 6. In case that the power switch 5 is implemented by a MOSFET, the voltage drop $\Delta U_5$ along the power switch 5 corresponds to the drain source voltage $U_{DS}$. The sensor component 4 does not only measure the current rise speed dI/dt but also provides protection of the power switch 5 by limiting the voltage drop $\Delta U_5$, e.g., the drain source voltage $U_{DS}$ of the MOSFET 5. The driver circuit 6 is adapted to determine based on the applied sum voltage $U_\Sigma$ an occurring short circuit current and/or an overload of the power switch 5 and/or an overload of the electrical motor M and is adapted to switch off the power switch 5 upon detection of an overcurrent and/or upon detection of an overload to protect both the connected electrical motor M and/or to protect the power switch 5 of the motor control apparatus 1 within a short switch-off period of less than five microseconds. In a preferred embodiment, the driver circuit 6 can switch off the power switch 5 within a switch-off period of less than two to five microseconds if the applied sum voltage $U_\Sigma$ exceeds a predetermined threshold voltage $U_{TH}$. The switch-off period can be in a range of 2 microseconds to 1 millisecond. The switch-off period is predefined by the circuitry connecting the sensor component 4 to the driver circuit 6 as shown in FIG. 9 and the internal propagation delays caused by gates and comparators integrated in the driver circuit 6 as illustrated in FIG. 10. In a possible implementation, the threshold voltage $U_{TH}$ can be configurable. If the applied sum voltage $U_\Sigma$ exceeds the configured threshold voltage $U_{TH}$, the driver circuit 6 of the motor control apparatus 1 does switch off automatically the power switch 5 within a short switch-off period of less than two to five microseconds, preferably with a period of less than two microseconds. In other use cases the switch-off period is less than 1 millisecond. The switch-off is performed hardwired without involving the control unit 8. In a possible embodiment, the sensor component 4 comprises a coil adapted to measure the current rise speed dI/dt of the electrical current I flowing via the sensor component 4. The sensor component 4 generates directly an induction voltage $U_L$ proportional to the change of the electrical current (dI/dt) flowing through the coil 4. In a possible embodiment, if the electrical current I has a current rise speed of around five Ampere per microsecond, the generated induction voltage $U_L$ applied to the driver circuit 6 is sufficient to trigger a switch-off operation of the power switch 5 connected in series with the sensor component 4. The inductivity L of the coil 4 can be adapted individually to the physical limitations of the used power switch 5. The hardware sensor component 4 is very robust against environmental influences and does not involve any electronic circuits to generate the sense voltage $\Delta U_4$. Consequently, the probability that the hardware sensor component 4 fails during operation of the motor control apparatus 1 is very low. In contrast to electronic circuits such as differentiators, the use of a hardware sensor component, in particular a coil, makes the motor control apparatus 1 extremely robust and increases its operation lifetime. Switch-off operations are performed by the driver circuit 6 without involving the relative slow control unit 8. Accordingly, the switch-off operation triggered by the electrical voltage $\Delta U_4$ generated physically by the sensor component 4 is performed exclusively by hardware of the driver circuit 6 as illustrated also in the circuit diagram of FIG. 10. The sensor component 4 is very sensitive and generates a sense voltage $\Delta U_4$ even before the electrical load current $I_L$ flowing to the electrical motor M reaches a high current level which potentially can damage components of the connected electrical motor M. Accordingly, the motor control apparatus 1 can comprise a protection mechanism which is faster by at least a factor of about 50 than conventional protection devices. The very fast switch-off operation provided by the hardware driver circuit 6 does guarantee that only a small protection of electrical energy is transferred to the connected electrical motor M in case of an overcurrent or short current scenario. Accordingly, even sensitive electrical components of the connected electrical motor M are protected efficiently by the protection mechanism of the motor control apparatus 1 according to the present invention. The protection mechanisms of the motor control apparatus 1, i.e., the overcurrent protection circuit 1A and the overload protection circuit 1B, do not only protect the electrical components of the connected electrical motor M but also the power switch 5 integrated in the motor control apparatus 1. Accordingly, the motor control apparatus 1 according to the present invention has an integrated self-protection mechanism to provide self-protection of components integrated in the motor control apparatus 1. The electrical power at the power switch 5 is limited in a possible implementation to around 80% of a predetermined operation power.

After the power switch 5 has been switched off, it is possible to switch on the power switch 5 again in case that predetermined switch-on conditions have been fulfilled. After a successful clearance of the switch-off cause, the power switch 5 can be switched on again. Consequently, the motor control apparatus 1 according to the present invention can be used again after a switch-off has been triggered. In a possible implementation, the power switch 5 can be switched on again after a configurable wait period has expired and/or after successful clearance of a switch-off cause has been achieved.

In a possible implementation, the microprocessor or processor 8A of the control unit 8 can calculate a current operation state of the power switch 5, in particular a current dissipation power and/or operation temperature T of the power switch 5. The control unit 8 can issue in a possible implementation a preemptive alarm in case that the monitored power of the power switch 5 or the temperature T of the power switch 5 does exceed admissible limits. The control unit 8 may observe a change of the power and temperature of the power switch 5 and can trigger a switch-off in case that a critical range has been reached.

The applied current phase L can comprise a frequency of e.g., 50 Hz or 60 Hz. In a possible embodiment, the sensor component 4 can comprise a coil with an inductivity L of less than 1 millihenry.

In a possible embodiment, the processor or FPGA 8A of the control unit 8 is programmable and can make use of a program model of components implemented in the connected electrical motor M and/or implemented in the motor control apparatus 1 itself. In a possible embodiment, model parameters of the employed model can be configured. These parameters can for instance comprise the normal operation current of the connected electrical motor M as well as the tripping class of the connected electrical load. In a possible embodiment, the control unit 8 is adapted to derive based on the current profiles measured by the current measurement component 7 and based on at least one parameter of the connected electrical motor a temperature profile of components of the connected electrical motor M and/or of components of the motor control apparatus 1 and may control the driver circuit 6 to switch off the power switch 5 if a deviation from a predetermined temperature range is detected. A parameter can e.g., comprise a set current or a tripping class of the connected electrical motor M. Further, the control unit 8 can be programmed with a configurable wait period. For instance, depending on the temperature profile, a corresponding wait period has to be expired before the power switch 5 can be switched on again. The driver circuit 6 can operate independently from the control unit 8 to switch off the associated power switch 5 within a brief reaction time in case that on applied sum voltage $U_\Sigma$ ($\Delta U_4+\Delta U_5$) exceeds a configurable threshold voltage $U_{TH}$. The voltage drop $\Delta U_5$ along the power switch 5 corresponds to the amplitude or level of the flowing electrical current. The voltage drop $\Delta U_4$ along the sensor component 4 corresponds to the current rise speed of the electrical current flowing via the sensor component 4 and the power switch 5 to the electrical motor M. In critical operation states, both voltage drops $\Delta U_4$, $\Delta U_5$ are added and applied as a sum voltage $U_\Sigma$ to the driver circuit 6 so that a critical operation state can already be detected in an initial phase of its occurrence. The application of a sum voltage $U_\Sigma$ to the integrated driver circuit chip 6 is illustrated in the circuit diagram of FIGS. 9, 10 requires only one input pin of this chip, thus promoting miniaturization of the motor control apparatus 1. The voltage drops $\Delta U_4$, $\Delta U_5$ can also be supplied in parallel to the driver circuit 6.

The driver circuit 6 can control an associated power switch 5 which can comprise in a possible implementation a gallium nitride MOSFET having a high voltage endurance of at least 800 Volts in the switch-off state and having a low impedance in its switch-on state. In further possible implementations, the power switch 5 can also comprise a SiC power MOSFET or a SiAlN MOSFET. As also illustrated in FIG. 11, the motor control apparatus 1 can comprise several redundant protection mechanisms using different measurement techniques.

The motor control apparatus 1 can comprise several protection mechanisms, in particular a first protection mechanism provided by the voltage drop $\Delta U_4$ along the sensor component 4, a second protection mechanism provided by the voltage drop $\Delta U_5$ along the power switch 5 and a third protection mechanism provided by the current measurement component 7. In case of a short circuit current, the sensor component 4 and the power switch 5 trigger the driver circuit 6 to perform a very fast switch-off operation. The current measurement component 7 further provides protection in case of overload. Accordingly, the motor control apparatus 1 not only provides control of a power supply to an electrical motor M but also an electronic overload and overcurrent protection which can be used again after the power switch 5 has been switched off, in particular after a programmable wait period has expired.

FIG. 9 shows a circuit diagram for illustrating a possible exemplary implementation of a motor control apparatus 1 providing switching and/or protection of an electrical motor M connected to the motor control apparatus 1. In the illustrated implementation, the motor control apparatus 1 comprises an input terminal 2 to receive a phase supply voltage U from a power supply network PSN having e.g., a voltage of 400 Volts. In the illustrated exemplary embodiment, each signal path from the input terminal 2 to the output terminal 3 comprises pairs of power switches 5 and associated sensor components 4. The illustrated circuit of FIG. 9, is symmetrical for positive current half-waves and negative current half-waves of an AC current supplied to the motor control apparatus 1. Between the input terminal 2 and the output terminal 3 of the motor control apparatus 1, a first coil 4-1 and a second coil 4-2 are provided. Each coil 4-1, 4-2 comprises an associated power switch 5-1, 5-2 as illustrated in the circuit diagram of FIG. 9. In the illustrated exemplary implementation, both coils 4-1, 4-2 have an inductivity L of 2.2 microhenry. In the illustrated implementation, the power switches 5-1, 5-2 are implemented by power MOSFETs. A varistor VAR can be provided in a possible implementation to eliminate disturbances. In the illustrated implementation, diodes D can be connected in parallel to each coil 4-1, 4-2 to reduce self-induction. The power switches 5-1, 5-2 are connected to a bridge rectifier circuit comprising in the illustrated implementation two pairs of complementary transistors Q1 to Q4. At the output side of the bridge rectifier circuit, capacitors C can be provided to provide a predetermined minimal delay. The delay has an influence on the switch-off period. In a possible implementation the delay can be adjusted by changing the capacity of the capacitor C thus adjusting the switch-off period to the requirements of the use case, e.g., in a range between 2 microseconds and 1 millisecond. Both resistors R1, R2 comprise a resistance which can be configured to adjust the sensitivity of the circuit illustrated in FIG. 9. As can be seen in FIG. 9, the driver circuit 6 is connected to the output of the bridge rectifier circuit to receive the sum voltage $U_\Sigma$ of power switch 5-1 or power switch 5-2 and sensor component 4-1 or sensor component 4-2 and to apply in return control voltages on the gates of the two illustrated power switches 5-1, 5-2. The driver circuit 6 is adapted to detect an occurring overcurrent, in particular a short circuit current, depending on the voltages generated directly by the sensor component 4-1 or the sensor component 4-2 and to switch off the associated power switch 5-1 or power switch 5-2 upon detection of a short circuit current flowing through the current path between input terminal 2 and output terminal 3 within a period of time, in particular within a very short switch-off period of less than two to five microseconds, to protect the electrical motor M connected to the output terminal 3 of the motor control apparatus 1.

FIG. 10 shows a block diagram of a possible exemplary embodiment of a driver circuit 6 which can be used in the motor control apparatus 1 according to the present invention. In the illustrated exemplary embodiment, the driver circuit 6 comprises a single IGBT driver ICIED020/12-B2 manufactured by Infineon Technologies. Other driver circuits may also be used, in partial an ASIC. As can be seen from the block diagram of FIG. 10, the driver circuit 6 comprises two separated circuit halves galvanically separated by transformers T1, T2. The left side of the driver circuit 6 illustrated in FIG. 10 is connected to the control unit 8 to receive control signals from the control unit 8, in particular in response to control commands or depending on measured current profiles. The low voltage side on the left side of the driver circuit 6 of the circuit diagram as shown in FIG. 10 is connected via transformers to the high voltage side provided on the right side of the illustrated circuit of FIG. 10. The sum voltage $U_\Sigma$ consisting of the voltage drop $\Delta U_4$ along the sensor component 4 and the voltage drop $\Delta U_5$ along the power switch 5 is applied in the illustrated implementation to the DESAT input pin of the driver circuit 6 and is compared by a comparator K3 of the driver circuit 6 with a configurable threshold voltage $U_{TH}$ of e.g., 9 Volts as illustrated in FIG. 10. If the configurable threshold voltage $U_{TH}$ is exceeded, a binary signal travels through several gates to drive an operational amplifier and to generate a control switch-off signal output to the gates of the power MOSFETs 5-1, 5-2 to switch both power MOSFETs off within a very short reaction time of less than two to five microseconds. The signal propagation delays caused by the gates and the comparator define a minimal switch-off period. The driver circuit 6 illustrated in FIG. 10 comprises two galvanically separated parts. The driver circuit 6 can be connected to a standard 5 Volt DSP or microcontroller 8A forming part of the control unit 8 wherein CMOS inputs/outputs are connected to the low voltage side. As can be seen from the circuit diagram of FIG. 10, a switch-off loop used to switch off the power switches 5-1, 5-2 in response to the applied sum voltage $U_\Sigma$ is provided only at the high voltage side of the driver circuit 6 so that the reaction time is very short because of the small propagation times of the logical signals propagating via the logical gates of the high voltage part of the driver circuit 6. The switch-off protection loop does not include the control unit 8 which is mostly used for normal switching and/or switching-off operations in response to receive switched-on/switched-off commands CMD and is also used for the power supply control of the electrical power flowing to the connected electrical motor M, in particular during a soft start up. In a possible implementation, the sensor component 4 and the power switch 5 as well as the driver circuit 6 can be provided on a common printed circuit board.

In a possible implementation, the sensor component 4 can be implemented by another component than a coil, in particular by a resistor with a corresponding local measurement circuit adapted to generate directly an electrical voltage U corresponding to the current rise speed of the electrical current I flowing through the respective sense resistor. The resistor can be an NTC or PTC resistor. In a possible embodiment, the resistance of the used resistor 4 can be temperature-dependent. Also, the temperature-dependent resistance can be configured individually to the physical limitations of the associated power switch 5.

In a further embodiment, a data model of the connected electrical motor M can be stored in a memory and evaluated by the processor or FPGA 8A of the control unit 8 to provide overload and/or overcurrent protection to the connected electrical motor M. The motor control apparatus 1 can comprise an output interface 13 adapted to signal a current operation state of the motor control apparatus 1, in particular of its integrated power switches 5. In a possible implementation, the output interface 13 can also indicate what safety mechanism or protection mechanism has been triggered by the switching-off of the integrated power switches 5. In this implementation, a user or operator of an automation system can be informed whether the switching-off of the power switch 5 was caused by a detected high current rise speed of the electrical current or because of a determined or detected overload of the power switch 5 or detected over-load of the connected electrical motor M or caused by an overload detection in view of the current profiles measured by the current measurement component 7. In a still further possible embodiment, information about the cause of the switching-off of the power switch 5 can also be output via a data interface of the motor control apparatus 1, for instance to a remote controller of an automation system including the protected electrical motor M connected to the output terminal 3 of the motor control apparatus 1. In a still further possible implementation, the motor control apparatus 1 can comprise a local data memory to store log data. The log data can comprise data about switch-off operations performed during operation of the automation system or during operation of the connected electrical motor M. In a possible implementation, the memorized log data can be evaluated to analyze critical operation states having occurred during operation of the automation system.

In a still further possible embodiment, a relay circuit 14 can be connected in series with the power switch 5. The relay circuits for different phases can use the change or sequence of power supply phases and/or provide a galvanic separation. During a switch-off operation controlled by the driver circuit 6 or by the control unit 8, the power switch 5 can be switched off before the associated relay circuit 14, whereas during a switch-on operation under control of the driver circuit 6 or under control of the control unit 8 the relay circuit 14 is switched on before the associated power switch 5. This does minimize the contact wear of the relay circuit 14 and increase the safety against failure of the power switch 5. Further, the switch-on and switch-off sequences make it possible to detect failures of the power switch 5.

In a still further possible embodiment of the motor control apparatus 1 according to the first aspect of the present invention, different models and/or motor operation characteristics for different electrical motors M can be uploaded to a configuration memory of the control unit 8 to provide matching load protection for the respective electrical motor M depending on the measured current profiles and/or voltage profiles and depending on at least one parameter of the connected electrical motor M. In a possible implementation, these data models can be downloaded from a central database connected to the control unit 8 via a data network. Depending on the type of the connected electrical motor M, different corresponding data models and/or motor operation characteristics can be loaded into the configuration memory of the control unit 8 and can be evaluated in view of the measured current and/or voltage profiles provided by the measurement components.

FIG. 11 shows schematically the operation architecture of the motor control apparatus 1 comprising redundant protection mechanisms and different measurement techniques to provide overload and/or overcurrent protection of the motor control apparatus 1 itself, in particular its power switches 5, and also for the electrical motor M connected to the motor control apparatus 1. Different redundant protection mechanisms differ in what they detect ($dI/dt$, $I_{max}$, $I_{limit}$, $I_{continuous}$) their respective reaction times and the measurement precision as also illustrated in FIG. 11. Even if one protection mechanism may fail another protection mechanism of the motor control apparatus 1 can still be applied.

The motor control apparatus 1 according to the present invention provides for an optimized start operation and switch-off of a connected electrical motor M. Further, the wearout of the connected electrical motor M during the different operation phases or states is minimized to maximize the operation lifetime of the electrical motor M.

In a possible embodiment the motor control apparatus 1 can be integrated in housing having electrical contacts provided for connection of the at least one input terminal 2 with a busbar of a busbar system.

In a still further possible embodiment, the motor control apparatus 1 can be integrated in a fuse housing and be used to substitute a conventional fuse received in a fuse holder of an electronic circuit. In a possible implementation the motor control apparatus 1 is integrated in a NH-fuse housing.

In a possible embodiment the switch-off period of motor control apparatus 1 is adjustable in a range between 2 microseconds and 1 millisecond. This switch-off period can be predefined by the hardware circuitry. In a possible embodiment the switch-off period can be adjusted in response to a user input command at input interface 12 of the user or data interface 15 which may change e.g., the capacitance of the capacitor C in FIG. 9 to cause a change of the signal propagation delay of the signal supplied to the driver circuit 6.

Further embodiments are possible. The motor characteristics memory 8C can be integrated in an exchangeable data carrier such as a memory card or USB stick inserted into a receiving slot in the housing of the motor control apparatus 1.

The sequence of components 4, 5, 7, 11 in the signal path shown in the block diagram of FIG. 2 can vary. Further redundant components can be provided, e.g., at least two coils 4, and/or two power switches 5 connected in parallel. Also, some components may not be integrated in the housing of the motor control apparatus 1 but can form external components.

The control unit 8 can determine in a possible embodiment an asymmetry of the supplied voltage phases applied to input terminals 2. If the detected difference between supply voltages L1, L2, L3 exceeds a certain threshold a warning signal can be output via output interface 13 and/or a switch-off can be triggered by the control unit 8. Further the sensor component 9 can be used to detect a too low or a too high supply voltage for the motor M triggering customatically a switch-off by the control unit 8. The sensor components can also be used to perform an isolation measurement of the motor M (e.g., winding to housing) or whether an element of the motor control apparatus 1 is faulty (e.g., the power switch 5).

The motor control apparatus 1 can be a stand-alone device or integrated into other entities. In possible embodiments the motor control apparatus is integrated in the housing of the motor M. The motor control apparatus 1 can also be integrated in a plug device pluggable into a socket of the motor's housing. It may also be integrated in an intermediate device such as a variable frequency controller provided between the power supply network PSN and the motor M. The motor control apparatus 1 can be connected directly or indirectly by means of an adapter to a busbar of a busbar system. The motor control apparatus 1 can also be mounted directly or indirectly via an adapter to a DIN rail or top hat rail.

The invention claimed is:

1. A motor control apparatus for controlling a power supply to an electrical multiphase AC motor connected to an output terminal of the motor control apparatus comprising:
    an overcurrent protection circuit i-having at least one input terminal adapted to receive a phase supply voltage from a power supply network and having a power switch through which the electrical multiphase AC motor is adapted to receive an electrical load current and having a current rise speed sensor component connected in series with the power switch of the overcurrent protection circuit, wherein the current rise speed sensor component of the overcurrent protection circuit is adapted to generate directly a voltage drop corresponding to the current rise speed of the electrical load current flowing from the input terminal of the motor control apparatus via the current rise speed sensor component and the power switch to the output terminal,
    said overcurrent protection circuit further having a driver circuit which is adapted to detect an occurring overcurrent depending on the voltage drop generated by the current rise speed sensor component and depending on a non-linear voltage drop along the power switch and which is adapted to switch off said power switch upon detection of an overcurrent within a switch-off period of less than one millisecond, wherein the driver circuit is adapted to operate independently from a control unit of said motor control apparatus to provide protection against an overcurrent by switching off the power switch if the generated voltage drop plus the voltage drop along the power switch applied as a sum voltage to an input of the driver circuit exceeds a configurable threshold voltage; said motor control apparatus further comprising a power supply control circuit having a voltage sensor component adapted to measure at the input terminal the received phase supply voltage notified to the control unit of the motor control apparatus to provide a supply voltage profile, wherein the control unit is adapted to control an electrical power supplied to the electrical multiphase AC motor depending on an operation mode of the electrical multiphase AC motor, wherein the electrical power supply to the electrical motor connected to the output terminal of the motor control apparatus is controlled by a processor or FPGA circuit of the control unit depending on the operation mode of the electrical multiphase AC motor and on the basis of the supply voltage profile and a load current profile.

2. The motor control apparatus according to claim 1 wherein the switch-off period of less than 1 millisecond is predefined by a hardware circuitry connecting the current rise speed sensor component to the driver circuit and by internal propagation delays caused by gates and comparators integrated in the driver circuit.

3. The motor control apparatus according to claim 1 further comprising:

an overload protection circuit having a load current sensor component adapted to measure continuously the load current flowing to the output terminal notified to the control unit of the motor control apparatus to provide the load current profile, wherein the control unit is adapted to determine an overload state of the electrical multiphase AC motor on the basis of the measured load current profile and wherein the control unit is adapted to control the driver circuit to switch-off the power switch if an overload state of the electrical multiphase AC motor is determined by the control unit.

4. The motor control apparatus according to claim 3 wherein the load current sensor component of the overload protection circuit comprises a Hall sensor, a GMR sensor, a transformer or a shunt resistor adapted to measure continuously the load current flowing to the output terminal of the motor control apparatus to provide the load current profile.

5. The motor control apparatus according to claim 1 wherein the control unit is adapted to perform a phase angle control of the electrical power supplied to the electrical multiphase AC motor depending on the determined operation mode of the electrical multiphase AC motor and depending on a power factor (cos φ) calculated on the basis of the load current profile measured by the load current sensor component of the overload protection circuit and on the basis of the supply voltage profile measured by the voltage sensor component of the power supply control circuit at the input terminal of the motor control apparatus.

6. The motor control apparatus according to claim 1 wherein the current rise speed sensor component of the overcurrent protection circuit comprises a coil which is adapted to generate an induction voltage drop depending on the current rise speed of the load current flowing through the current rise speed sensor component of the overcurrent protection circuit or wherein the current rise speed sensor comprises a resistor having a temperature-dependent resistance configured to the physical limitations of the associated power switch.

7. The motor control apparatus according to claim 1 wherein the voltage sensor component of the power supply control circuit is adapted to supply a fraction of the supply voltage (Vin) at the input terminal to the control unit of the motor control apparatus to provide the supply voltage profile.

8. The motor control apparatus according to claim 1 wherein the load current sensor component of the overload protection circuit and the voltage sensor component of the power supply control circuit are connected to associated analog-to-digital converters adapted to convert the measured analog load current profile and the measured supply voltage profile into corresponding measurement values stored in a data memory of the control unit as load current profile data and supply voltage profile data, wherein the processor or FPGA of the control unit is adapted to calculate a power factor (cos φ) on the basis of the load current profile data and the supply voltage profile data stored in the data memory of the control unit.

9. The motor control apparatus according to claim 8 wherein the processor or FPGA of the control unit is adapted to determine an operation mode of the connected electrical multiphase AC motor by processing the load current profile data and the supply voltage profile data stored in the data memory of the control unit.

10. The motor control apparatus according to claim 1 wherein the electrical multiphase AC motor comprises as operation modes:

an idle operation mode (mode 0) wherein the electrical multiphase AC motor is switched off and the rotation speed of the electrical multiphase AC motor is zero, a start operation mode (mode 1) wherein the electrical multiphase AC motor is started and the rotation speed of the electrical multiphase AC motor is increased, a steady-state operation mode (mode 2) wherein the rotation speed of the electrical multiphase AC motor is maintained constant, and a stop operation mode (mode 3) wherein the electrical multiphase AC motor is stopped and the rotation speed of the electrical multiphase AC motor is decreased.

11. The motor control apparatus according to claim 10 wherein the control unit is adapted to perform a phase angle control or to apply a predefined switching pattern to the power switch depending on the calculated power factor (cos φ) and the determined operation mode of the electrical multiphase AC motor (M).

12. The motor control apparatus according to claim 1 wherein the power switch comprises an IGBT or a power MOSFET, in particular a SiC MOSFET, a GaN MOSFET or a ScAlN MOSFET.

13. The motor control apparatus according to claim 1 wherein the power switch is switched on after a configurable wait period and/or after successful clearance of a switch-off cause or if other predetermined switch-on conditions are fulfilled.

14. The motor control apparatus according to claim 1 comprising different input terminals provided for different phase supply voltages of the power supply network, wherein each input terminal is connected via a signal path to an output terminal), wherein each signal path comprises a pair of power switches and an associated current rise speed sensor component, wherein each pair of power switches provided in the signal path between the input terminal and the output terminal comprises a first power switch provided for a positive current half-wave of an AC current and a second power switch provided for a negative current half-wave of an AC current.

15. The motor control apparatus according to claim 14 wherein the control unit of the motor control apparatus is adapted to determine whether the received phase supply voltages at different input terminals and/or load currents provided for different phases at different output terminals indicate a symmetrical power supply of the connected electrical multiphase AC motor by the power supply network connected to the input terminals of the motor control apparatus on the basis of the supply voltage profile data stored in the data memory of the control unit or wherein the control unit of the motor control apparatus is adapted to determine whether an electrical multiphase AC motor is connected to the output terminal on the basis of the profile data stored in the data memory of the control unit.

16. The motor control apparatus according to claim 15 wherein the control unit is adapted to switch off automatically the power switches if an unsymmetrical power supply of the motor control apparatus by the power supply network or an unsymmetrical power supply of the electrical multiphase AC motor by the motor control apparatus is recognized by the control unit.

17. The motor control apparatus according to claim 1 wherein the driver circuit comprises a low voltage side connected to the control unit and a high voltage side connected to the power switch, wherein the low voltage side and the high voltage side of the driver circuit are galvanically separated from each other.

18. The motor control apparatus according to claim 1 wherein the processor or FPGA of the control unit has access to at least one motor operation characteristic of the connected electrical multiphase AC motor stored in a load characteristic memory of the control unit indicating for operation parameters at least one admissible operation zone, at least one critical operation zone and/or at least one inadmissible operation zone,
wherein the operation parameters comprise as a first operation parameter a ratio between a load current and a rated current of the electrical multiphase AC motor and as a second operation parameter time.

19. The motor control apparatus according to claim 18 wherein the processor or FPGA of the control unit is adapted to evaluate the load current profile data and the supply voltage profile data stored in the data memory of the control unit with respect to the motor operation characteristics of the connected electrical multiphase AC motor stored in the load characteristic memory to determine whether combinations of different operation parameters are in a critical or inadmissible operation zone of the stored motor operation characteristic.

20. The motor control apparatus according to claim 19 wherein the control unit is adapted to output a warning signal via an output interface of a user or data interface of the motor control apparatus if a combination of the operation parameters is determined to be in a critical operation zone of the motor operation characteristic of the electrical multiphase AC motor stored in the load characteristic memory of the control unit.

21. The motor control apparatus according to claim 19 wherein the control unit is adapted to generate automatically a switch-off control signal applied to the power switch to switch off the load current if a combination of operation parameters is determined to be in an inadmissible operation zone of the motor operation characteristic of the electrical multiphase AC motor stored in the load characteristic memory of the control unit.

22. The motor control apparatus according to claim 1 wherein the configurable threshold voltage of the driver circuit is 9 Volts.

23. The motor control apparatus according to claim 1 wherein the driver circuit is an integrated circuit chip, wherein the sum voltage is applied to only one pin of said integrated circuit chip.

24. The motor control apparatus according to claim 1 wherein a relay circuit is connected in series with the power switch.

25. An automation system comprising a motor control apparatus and an electrical multiphase AC motor connected to the output terminals of said motor control apparatus, wherein the motor control apparatus is provided for controlling a power supply to the electrical multiphase AC motor, said motor control apparatus comprising an overcurrent protection circuit having at least one input terminal adapted to receive a phase supply voltage from a power supply network and having a power switch through which the electrical multiphase AC motor is adapted to receives an electrical load current and having a current rise speed sensor component connected in series with the power switch of the overcurrent protection circuit,
wherein the current rise speed sensor component of the overcurrent protection circuit is adapted to generate directly a voltage drop corresponding to the current rise speed of the electrical load current flowing from the input terminal of the motor control apparatus via the current rise speed sensor component and the power switch to the output terminal,
said overcurrent protection circuit further having a driver circuit which is adapted to detect an occurring overcurrent depending on the voltage drop generated by the current rise speed sensor component and depending on a non-linear voltage drop along the power switch and which is adapted to switch off said power switch upon detection of an overcurrent within a switch-off period of less than one millisecond, wherein the driver circuit is adapted to operate independently from a control unit of said motor control apparatus to provide protection against an overcurrent by switching off the power switch if the generated voltage drop plus the voltage drop along the power switch applied as a sum voltage to an input of the driver circuit exceeds a configurable threshold voltage; said motor control apparatus further comprising
a power supply control circuit having a voltage sensor component adapted to measure at the input terminal the received phase supply voltage notified to the control unit of the motor control apparatus to provide a supply voltage profile,
wherein the control unit is adapted to control an electrical power supplied to the electrical multiphase AC motor depending on an operation mode of the electrical multiphase AC motor,
wherein the electrical power supply to the electrical motor connected to the output terminal of the motor control apparatus is controlled by a processor or FPGA circuit of the control unit depending on the operation mode of the electrical multiphase AC motor and on the basis of the supply voltage profile and a load current profile.

26. An electrical multiphase AC motor comprising a motor control apparatus, said motor control apparatus comprising an overcurrent protection circuit having at least one input terminal adapted to receive a phase supply voltage from a power supply network and having a power switch through which the electrical multiphase AC motor is adapted to receives an electrical load current and having a current rise speed sensor component connected in series with the power switch of the overcurrent protection circuit, wherein the current rise speed sensor component of the overcurrent protection circuit is adapted to generate directly a voltage drop corresponding to the current rise speed of the electrical load current flowing from the input terminal of the motor control apparatus via the current rise speed sensor component and the power switch to the output terminal, said overcurrent protection circuit further having a driver circuit which is adapted to detect an occurring overcurrent depending on the voltage drop generated by the current rise speed sensor component and depending on a non-linear voltage drop along the power switch and which is adapted to switch off said power switch upon detection of an overcurrent within a switch-off period of less than one millisecond, wherein the driver circuit is adapted to operate independently from a control unit (8) of said motor control apparatus to provide protection against an overcurrent by switching off the power switch if the generated voltage drop plus the voltage drop along the power switch applied as a sum voltage to an input of the driver circuit exceeds a configurable threshold voltage; said motor control apparatus further comprising a power supply control circuit having a voltage sensor component adapted to measure at the input terminal the received phase supply voltage notified to the control unit of the motor control apparatus to provide a supply voltage profile, wherein the control unit is adapted to control an electrical power supplied to the electrical multiphase AC motor depending on an operation mode of the electrical multiphase AC motor, wherein the electrical power supply to the electrical motor connected to the output terminal of the motor control apparatus is controlled by a processor or FPGA circuit of the control unit depending on the operation mode of the electrical multiphase AC motor and on the basis of the supply voltage profile and a load current profile.

27. A busbar system comprising a motor control apparatus and busbars to which at least one input terminal of said motor control apparatus (is connected, said motor control apparatus comprising an overcurrent protection circuit having at least one input terminal adapted to receive a phase supply voltage from a power supply network and having a power switch through which the electrical multiphase AC motor is adapted to receives an electrical load current and having a current rise speed sensor component connected in series with the power switch of the overcurrent protection circuit, wherein the current rise speed sensor component of the overcurrent protection circuit is adapted to generate directly a voltage drop corresponding to the current rise speed of the electrical load current flowing from the input terminal of the motor control apparatus via the current rise speed sensor component and the power switch to the output terminal, said overcurrent protection circuit further having a driver circuit which is adapted to detect an occurring overcurrent depending on the voltage drop generated by the current rise speed sensor component and depending on a non-linear voltage drop along the power switch and which is adapted to switch off said power switch upon detection of an overcurrent within a switch-off period of less than one millisecond, wherein the driver circuit is adapted to operate independently from a control unit of said motor control apparatus to provide protection against an overcurrent by switching off the power switch if the generated voltage drop plus the voltage drop along the power switch applied as a sum voltage to an input of the driver circuit exceeds a configurable threshold voltage; said motor control apparatus further comprising a power supply control circuit having a voltage sensor component adapted to measure at the input terminal the received phase supply voltage notified to the control unit of the motor control apparatus to provide a supply voltage profile, wherein the control unit is adapted to control an electrical power supplied to the electrical multiphase AC motor depending on an observed operation mode of the electrical multiphase AC motor, wherein the electrical power supply to the electrical motor connected to the output terminal of the motor control apparatus is controlled by a processor or FPGA circuit of the control unit depending on the operation mode of the electrical multiphase AC motor and on the basis of the supply voltage profile and a load current profile.

28. A fuse housing, comprising an integrated motor control apparatus, said motor control apparatus comprising an overcurrent protection circuit having at least one input terminal adapted to receive a phase supply voltage from a power supply network and having a power switch through which the electrical multiphase AC motor is adapted to receives an electrical load current and having a current rise speed sensor component connected in series with the power switch of the overcurrent protection circuit, wherein the current rise speed sensor component of the overcurrent protection circuit is adapted to generate directly a voltage drop corresponding to the current rise speed of the electrical load current flowing from the input terminal of the motor control apparatus via the current rise speed sensor component and the power switch to the output terminal, said overcurrent protection circuit further having a driver circuit which is adapted to detect an occurring overcurrent depending on the voltage drop generated by the current rise speed sensor component and depending on a non-linear voltage drop along the power switch and which is adapted to switch off said power switch upon detection of an overcurrent within a switch-off period of less than one millisecond, wherein the driver circuit is adapted to operate independently from a control unit of said motor control apparatus to provide protection against an overcurrent by switching off the power switch if the generated voltage drop plus the voltage drop along the power switch applied as a sum voltage to an input of the driver circuit exceeds a configurable threshold voltage; said motor control apparatus further comprising a power supply control circuit having a voltage sensor component adapted to measure at the input terminal the received phase supply voltage notified to the control unit of the motor control apparatus to provide a supply voltage profile, wherein the control unit is adapted to control an electrical power supplied to the electrical multiphase AC motor depending on an observed operation mode of the electrical multiphase AC motor, wherein the electrical power supply to the electrical motor connected to the output terminal of the motor control apparatus is controlled by a processor or FPGA circuit of the control unit depending on the operation mode of the electrical multiphase AC motor and on the basis of the supply voltage profile and a load current profile.

29. A plug device comprising an integrated motor control apparatus, wherein the plug device is pluggable into a socket of a motor, said integrated motor control apparatus comprising an overcurrent protection circuit having at least one input terminal adapted to receive a phase supply voltage from a power supply network and having a power switch through which the electrical multiphase AC motor is adapted to receives an electrical load current and having a current rise speed sensor component connected in series with the power switch of the overcurrent protection circuit, wherein the current rise speed sensor component of the overcurrent protection circuit is adapted to generate directly a voltage drop corresponding to the current rise speed of the electrical load current flowing from the input terminal of the motor control apparatus via the current rise speed sensor component and the power switch to the output terminal, said overcurrent protection circuit further having a driver circuit which is adapted to detect an occurring overcurrent depending on the voltage drop generated by the current rise speed sensor component and depending on a non-linear voltage drop along the power switch and which is adapted to switch off said power switch upon detection of an overcurrent within a switch-off period of less than one millisecond, wherein the driver circuit is adapted to operate independently from a control unit of said motor control apparatus to provide protection against an overcurrent by switching off the power switch if the generated voltage drop plus the voltage drop along the power switch applied as a sum voltage to an input of the driver circuit exceeds a configurable threshold voltage, said integrated motor control apparatus further comprising a power supply control circuit having a voltage sensor component adapted to measure at the input terminal the received phase supply voltage notified to the control unit of the motor control apparatus to provide a supply voltage profile, wherein the control unit is adapted to control an electrical power supplied to the electrical multiphase AC motor depending on an operation mode of the electrical multiphase AC motor, wherein the electrical power supply to the electrical motor connected to the output terminal of the motor control apparatus is controlled by a processor or FPGA circuit of the control unit depending on the operation mode of the electrical multiphase AC motor and on the basis of the supply voltage profile and a load current profile.

\* \* \* \* \*